US010789031B2

(12) United States Patent
Iida et al.

(10) Patent No.: US 10,789,031 B2
(45) Date of Patent: Sep. 29, 2020

(54) IMAGE FORMING APPARATUS THAT ENABLES PRINT SETTING INFORMATION STORED IN A FOLDER TO BE TEMPORARILY CHANGED, SYSTEM, METHOD OF CONTROLLING SAME, AND STORAGE MEDIUM

(71) Applicant: CANON KABUSHIKI KAISHA, Tokyo (JP)

(72) Inventors: Toshihiko Iida, Toride (JP); Yoshiji Kanamoto, Tokyo (JP); Hiroya Igarashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/521,992

(22) Filed: Jul. 25, 2019

(65) Prior Publication Data

US 2020/0034087 A1 Jan. 30, 2020

(30) Foreign Application Priority Data

Jul. 27, 2018 (JP) .................................. 2018-141634

(51) Int. Cl.
*G06F 3/12* (2006.01)
(52) U.S. Cl.
CPC ............ *G06F 3/127* (2013.01); *G06F 3/1204* (2013.01); *G06F 3/1288* (2013.01)
(58) Field of Classification Search
None
See application file for complete search history.

(56) References Cited

U.S. PATENT DOCUMENTS

2008/0297833 A1* 12/2008 Hatakeyama ......... G06F 3/1204
358/1.15
2009/0273799 A1* 11/2009 Hanawa ............. H04N 1/00384
358/1.9

(Continued)

FOREIGN PATENT DOCUMENTS

JP 2014-219920 A 11/2014

OTHER PUBLICATIONS

Toshihiko Iida et al., U.S. Appl. No. 16/519,670, filed Jul. 23, 2019.

(Continued)

*Primary Examiner* — Miya J Williams
(74) *Attorney, Agent, or Firm* — Venable LLP

(57) ABSTRACT

An image forming apparatus has a storage unit that provides a folder with which print setting information is associated, and an image forming unit for forming an image on a sheet. The present image forming apparatus transmits, to an external apparatus, screen information for causing a screen for accepting a designation of a print file to be transferred to the image forming apparatus in association with the folder to be displayed. The screen enables acceptance of a temporary setting that is applied in preference to print setting information stored in the folder in advance. Also, the present image forming apparatus causes the image forming unit to execute image formation based on the print file transferred in association with the folder, in accordance with print settings resulting from preferentially applying a setting item of the temporary setting to the print setting information.

13 Claims, 33 Drawing Sheets

(56) References Cited

U.S. PATENT DOCUMENTS

2016/0378408 A1* 12/2016 Asano .................. G06F 3/1205
358/1.15
2019/0369930 A1* 12/2019 Iida ...................... G06F 3/1257

OTHER PUBLICATIONS

Yoshiji Kanamoto et al., U.S. Appl. No. 16/523,253, filed Jul. 26, 2019.

* cited by examiner

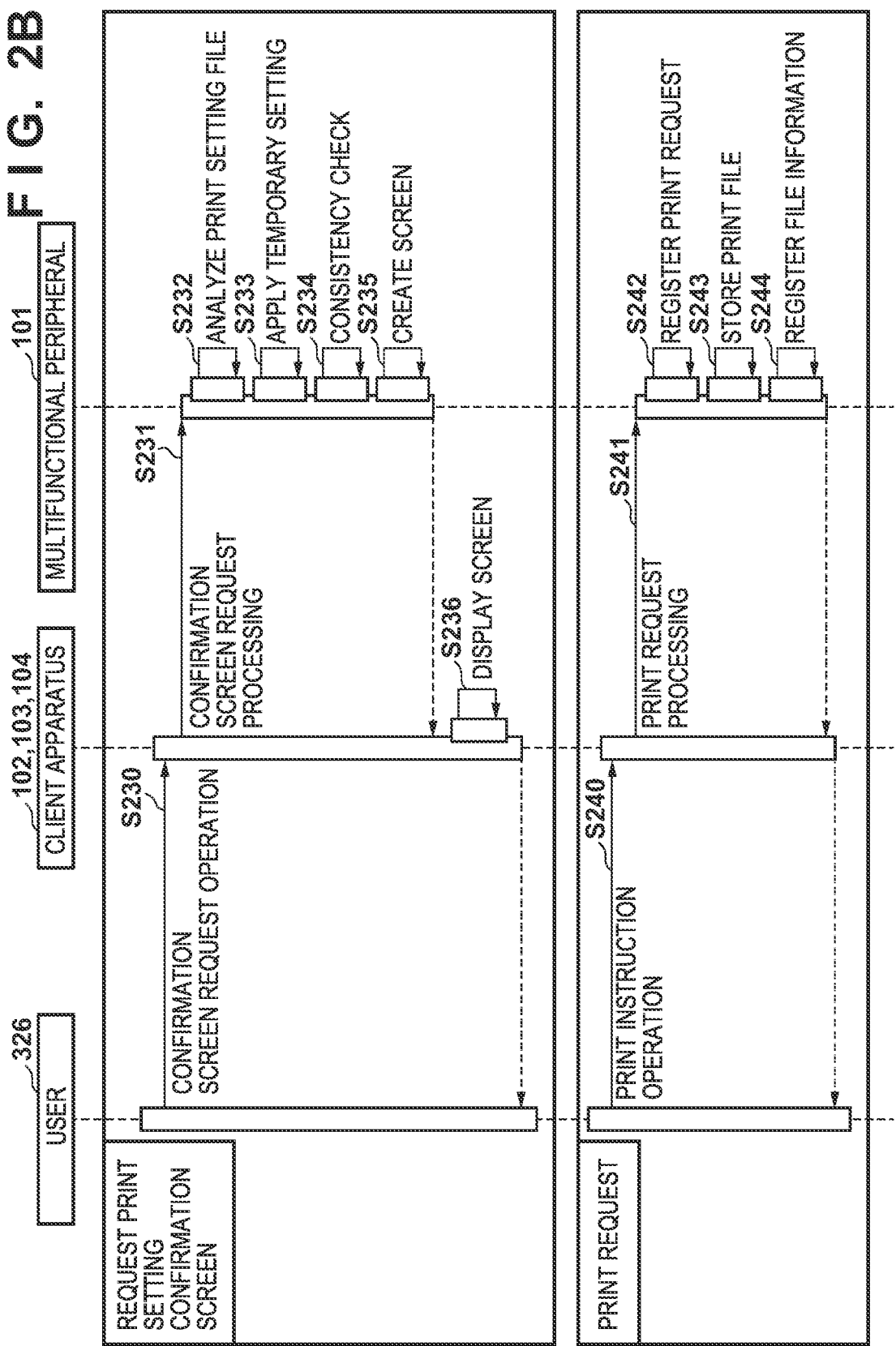

FIG. 2C

USER 326

CLIENT APPARATUS 102, 103, 104

MULTIFUNCTIONAL PERIPHERAL 101

PRINT PROCESSING

LOOP UNTIL THERE CEASES TO BE PRINT ELEMENT IN PRINT LIST, OR FILE INFORMATION IN FIRST JOB IS NOT REGISTERED

- S250 DETECT UPDATE OF PRINT LIST
- S251 OBTAIN FIRST PRINT REQUEST
- S252 ANALYZE PRINT SETTING FILE
- S253 APPLY TEMPORARY SETTING
- S254 CONSISTENCY CHECK
- S255 EXECUTE PRINTING; REMOVE FROM PRINT LIST

RECORD RESULT

- S260 DETECT JOB END
- S261 STORE RESULT

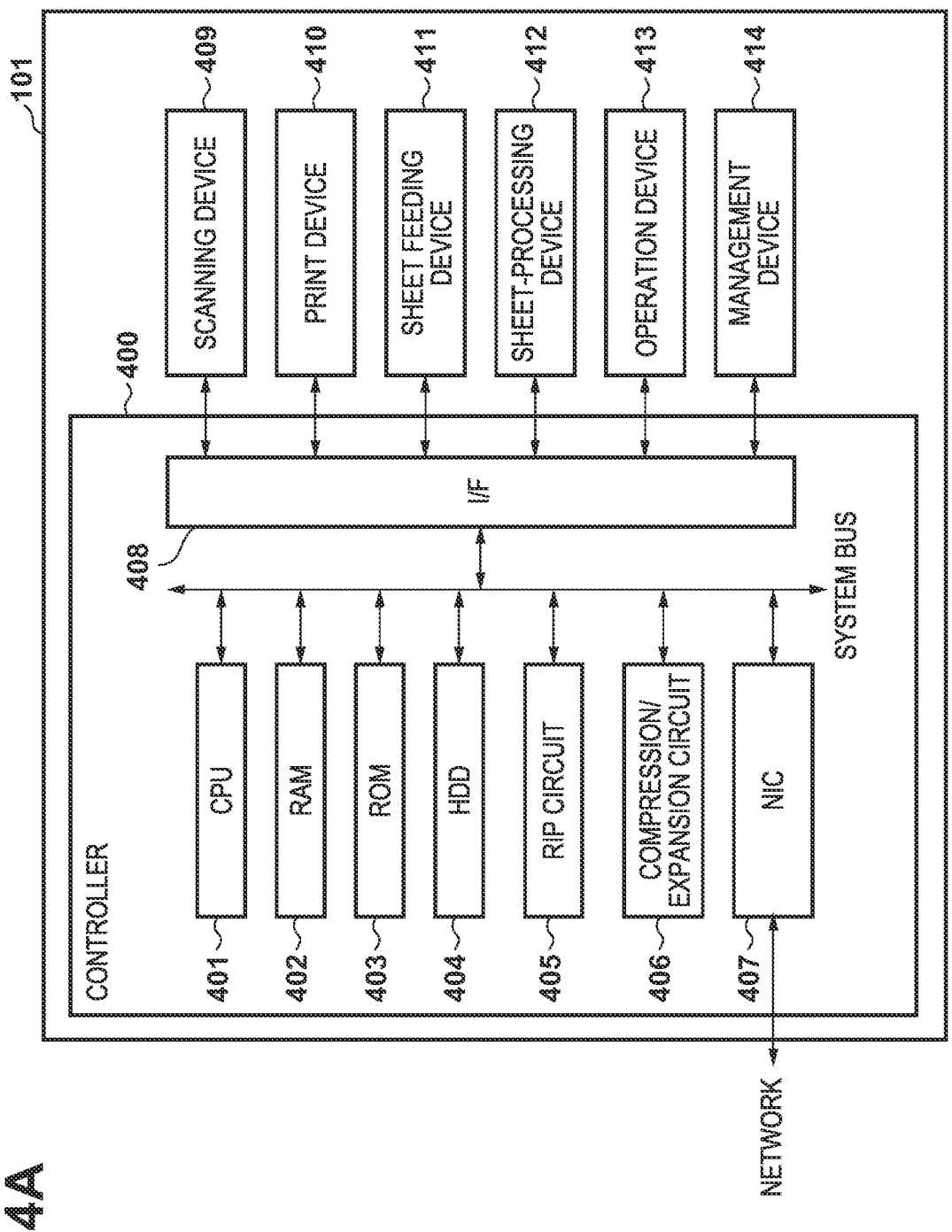

F I G. 4B

| | |
|---|---|
| BOOT LOADER | ~601 |
| OPERATING SYSTEM | ~602 |
| NETWORK CONTROL PROGRAM | ~603 |
| FILE SYSTEM SERVER | ~604 |
| WEB SERVER | ~605 |
| HOT FOLDER FUNCTION PROGRAM | ~606 |
| JDF FUNCTION PROGRAM | ~607 |
| PDL PRINT FUNCTION PROGRAM | ~608 |
| MEDIA MANAGEMENT PROGRAM | ~609 |
| USER AUTHENTICATION PROGRAM | ~610 |
| PRINT JOB QUEUE MANAGEMENT PROGRAM | ~611 |
| OTHER PROGRAMS | ~612 |

F I G. 6A

```
http://192.168.0.2/internalHotfolder.html    User Authentication

Internal Hot Folder Login

User Name:          [            ]~801
    Password:           [            ]~802
    Login Destination:  [This Device ∨]~803

Enter a user name, password, and specify a Login Destination and click [Log In].

[  Log In  ]~804
```

F I G. 6B

```
http://192.168.0.2/internalHotfolder.html    User Authentication

Internal Hot Folder Login

User Name:          [UserAAA     ]~801
    Password:           [●●●●●●●     ]~802
    Login Destination:  [This Device ∨]~803

Enter a user name, password, and specify a Login Destination and click [Log In].

[  Log In  ]~804
```

FIG. 8A
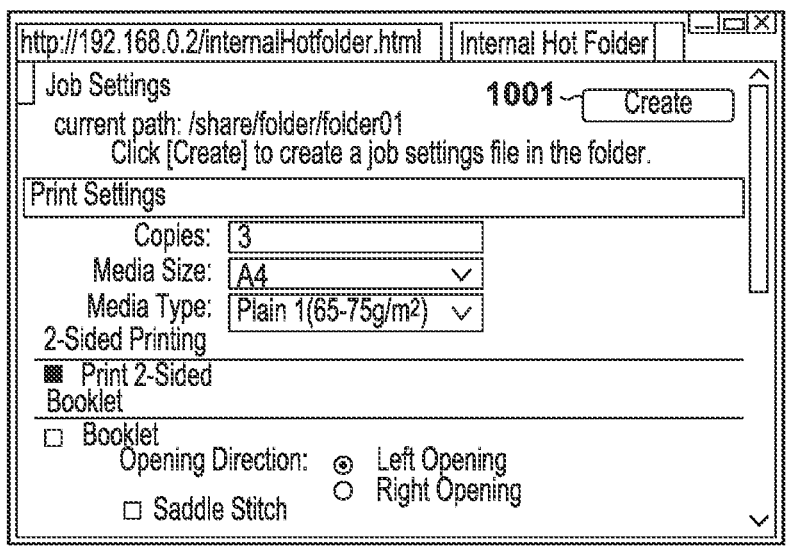
FIG. 8B
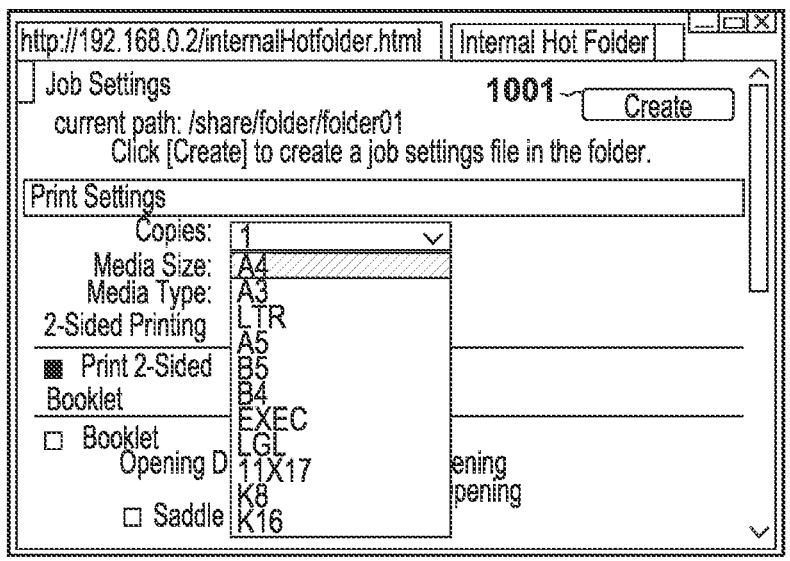
FIG. 8C

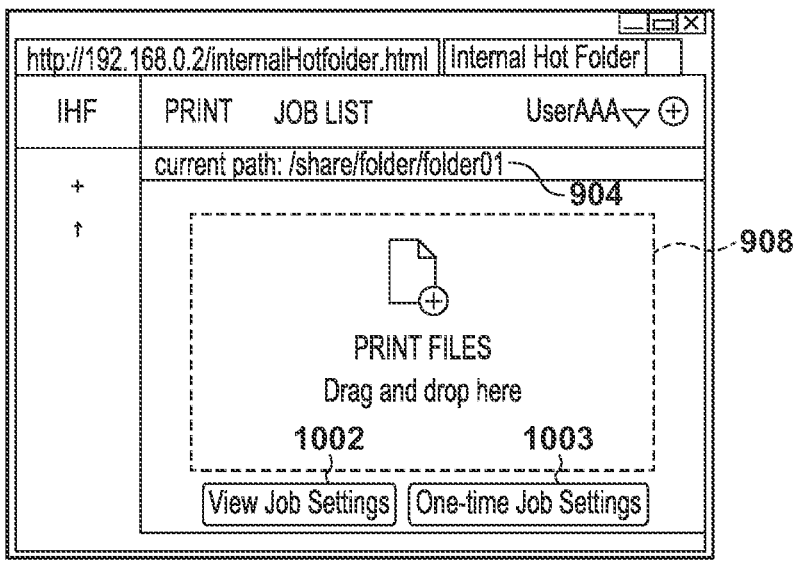

FIG. 8D

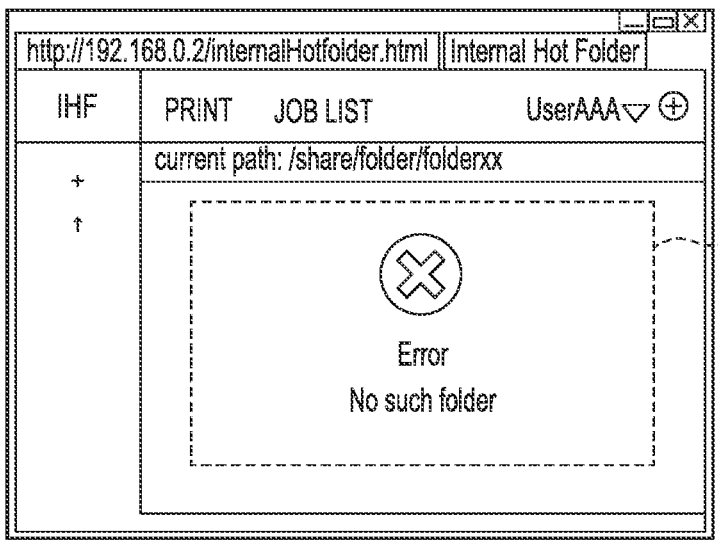

```
<?xml version='1.0'?>  ~1006
<JobSettings>  ~1007
    <MetaData>
        <FolderPath>/share/folder/folder01</FolderPath>  ~1004
    </MetaData>
    <PrintSettings>  ~1008
        <Copies>1</Copies>
        <Media>
            <MediaSize>A4</MediaSize>
            <MediaType>Auto</MediaType>
            <Location>Auto</Location>
        </Media>
        <Collate>SheetSetAndJob</Collate>
        <Disjointing>
            <OffsetDirection>None</OffsetDirection>
        </Disjointing>
    </PrintSettings>
    <LayoutSettings>  ~1009
        <Sides>OneSidedFront</Sides>
    </LayoutSettings>
</JobSettings>
```
~1005

```
<?xml version="1.0" encoding="UTF-8" standalone="no"?>
<JDF xmlns="http://www.CIP4.org/JDFSchema_1_1"
     xmlns:cj="http://www.canon.com/ns/CanonJDF" Activation="Active"
     Category="DigitalPrinting" ICSVersions="IDP_L1-1.0 Base_L1-1.0"
     ID="ID01" JobID="JobID01" JobPartID="JobPartID01" MaxVersion="1.2"
     Status="Ready" Type="Combined"
     Types="LayoutPreparation Imposition Interpreting Rendering DigitalPrinting"
     Version="1.2" cj:OwnerName="1">
 <ResourcePool>
  <RunList Class="Parameter" ID="IDRL" PartIDKeys="Run" Status="Available">
   <RunList Run="0">
    <LayoutElement>
     <FileSpec MimeType="application/pdf" URL="cid:Content00@hostname.com"/>
    </LayoutElement>
   </RunList>
  </RunList>
  <LayoutPreparationParams Class="Parameter" ID="IDLPP" Sides="OneSidedFront" Status="Available"/>
  <ColorantControl Class="Parameter" ID="IDCC" Status="Available"/>
  <InterpretingParams Class="Parameter" ID="IDIP" Status="Available"/>
  <RenderingParams Class="Parameter" ID="IDRP" Status="Available"/>
  <DigitalPrintingParams Class="Parameter" Collate="SheetSetAndJob" ID="IDDPP" Status="Available">
   <MediaRef rRef="MED_000"/>
   <Disjointing OffsetDirection="None"/>
  </DigitalPrintingParams>
  <Component Class="Quantity" ComponentType="FinalProduct" ID="IDC_DPP" Status="Unavailable"/>
  <Media Class="Consumable" Dimension="842 595" ID="MED_000" Status="Available">
   <Location LocationName="AutoSelect"/>
  </Media> </ResourcePool>
 <ResourceLinkPool>
  <LayoutPreparationParamsLink CombinedProcessIndex="0" Usage="Input" rRef="IDLPP"/>
  <RunListLink CombinedProcessIndex="0 1" Usage="Input" rRef="IDRL"/>
  <ColorantControlLink CombinedProcessIndex="2 4" Usage="Input" rRef="IDCC"/>
  <InterpretingParamsLink CombinedProcessIndex="2" Usage="Input" rRef="IDIP"/>
  <RenderingParamsLink CombinedProcessIndex="3" Usage="Input" rRef="IDRP"/>
  <DigitalPrintingParamsLink ="4" Usage="Input" rRef="IDDPP"/>
  <ComponentLink Amount="1" CombinedProcessIndex="4" Usage="Output" rRef="IDC_DPP"/>
  <MediaLink CombinedProcessIndex="4" Usage="Input" rRef="MED_000"/>
 </ResourceLinkPool>
</JDF>
```

F I G. 10C

```
POST /vip HTTP/1.1
Host: 172.16.187.222:8000
Content-Type: multipart/form-data; boundary=----27703d48d4ba6558
------27703d48d4ba6558
Content-Disposition: form-data; name="folderpath"

/share/folder/folder01
------27703d48d4ba6558
Content-Disposition: form-data; name="pages"

2~10
------27703d48d4ba6558
Content-Disposition: form-data; name="copies"

1
------27703d48d4ba6558
Content-Disposition: form-data; name="file", filename="FILE NAME"
Content-Type: application/pdf FILE DATA
------27703d48d4ba6558--
```

1220
1221 POST /vip HTTP/1.1
1222 /share/folder/folder01
1223 2~10
1224 1
1225 Content-Type: application/pdf
1226 FILE DATA

F I G. 10D

```
<?xml version="1.0"?>
<ParseJDF>
  <FolderPath>/share/folder/folder01</FolderPath>
  <Pages>2~10</Pages>
  <Copies>1</Copies>
</ParseJDF>
```

1230
1231 <FolderPath>/share/folder/folder01</FolderPath>
1232 <Pages>2~10</Pages>
1233 <Copies>1</Copies>

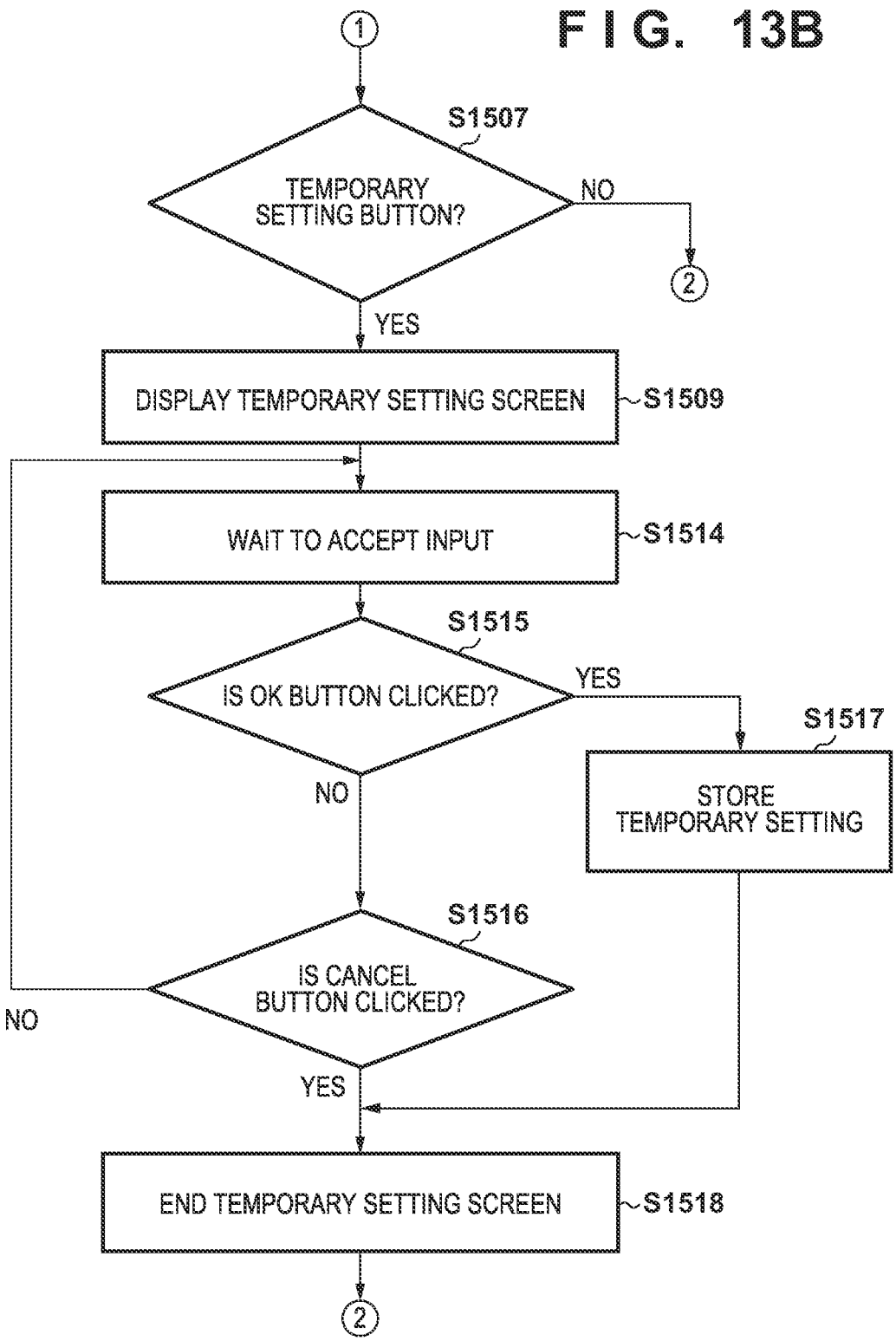

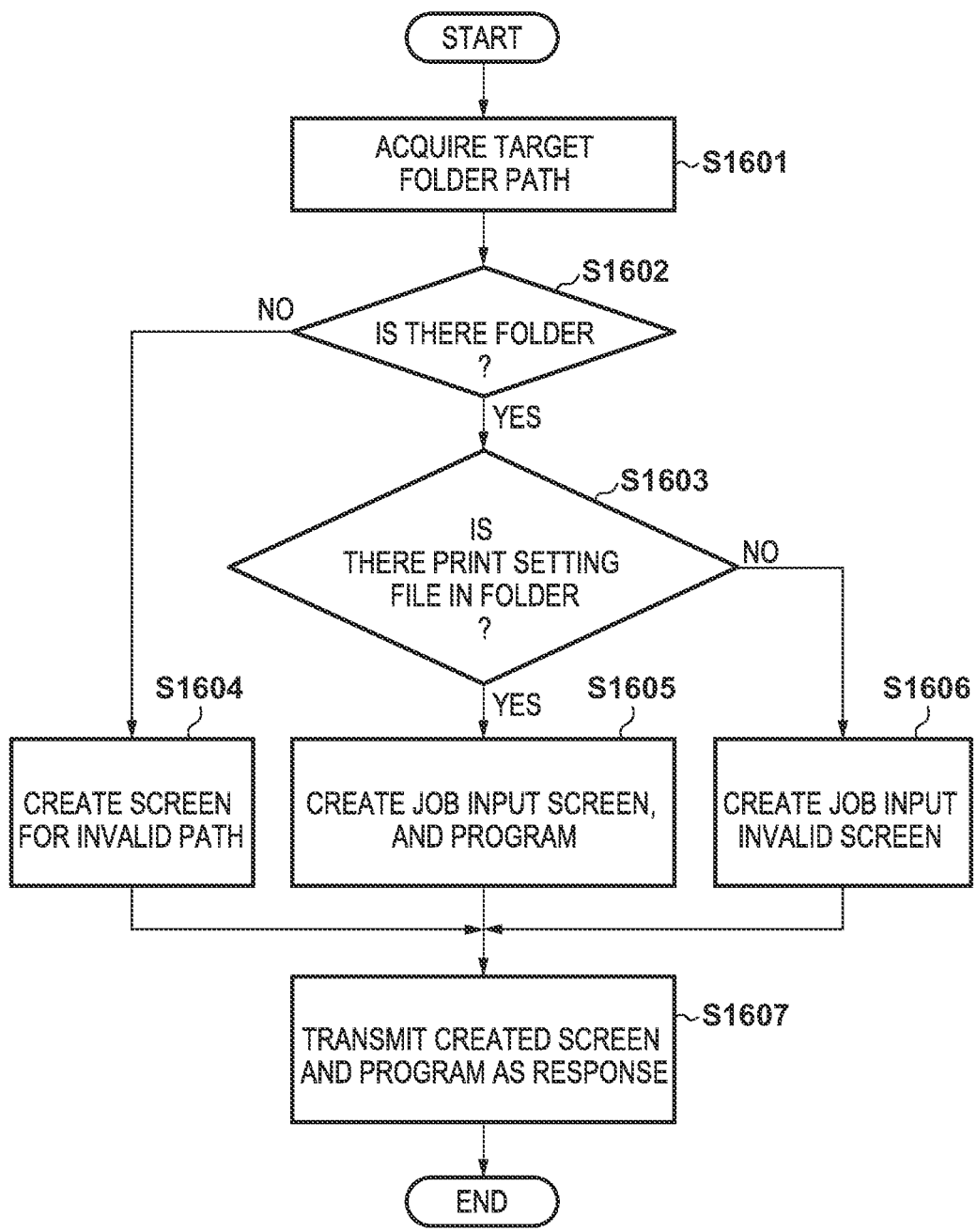

FIG. 19A

| ID | DESTINATION FOLDER PATH | USER NAME | FILE NAME | TEMPORARY SETTING | FILE PATH |
|---|---|---|---|---|---|
| 101 | /share/folder/folder01 | Sato | marketing_materials.pdf | copies=1,Pages=2_10 | /share/folder/folder01/marketing_materials.pdf |
| 102 | /share/folder/folder02 | Koide | document.pdf | copies=5, media=A3 | |

FIG. 19B

| ID | DESTINATION FOLDER PATH | USER NAME | FILE NAME | TEMPORARY SETTING | FILE PATH |
|---|---|---|---|---|---|
| 102 | /share/folder/folder02 | Koide | document.pdf | copies=5, media=A3 | |

FIG. 19C

| ID | DESTINATION FOLDER PATH | USER NAME | FILE NAME | TEMPORARY SETTING | FILE PATH |
|---|---|---|---|---|---|
| 102 | /share/folder/folder02 | Koide | document.pdf | copies=5, media=A3 | |
| 103 | /share/folder/folder01 | Ueda | handout.pdf | | |

F I G. 19D

| ID | DESTINATION FOLDER PATH | USER NAME | FILE NAME | TEMPORARY SETTING | FILE PATH |
|---|---|---|---|---|---|
| 102 | /share/folder/folder02 | Koide | document.pdf | copies=5, media=A3 | |
| 103 | /share/folder/folder01 | Ueda | handout.pdf | | /share/folder/folder01/handout.pdf |

F I G. 19E

| ID | DESTINATION FOLDER PATH | USER NAME | FILE NAME | TEMPORARY SETTING | FILE PATH |
|---|---|---|---|---|---|
| 102 | /share/folder/folder02 | Koide | document.pdf | copies=5, media=A3 | /share/folder/folder02/document.pdf |
| 103 | /share/folder/folder01 | Ueda | handout.pdf | | /share/folder/folder01/handout.pdf |

# IMAGE FORMING APPARATUS THAT ENABLES PRINT SETTING INFORMATION STORED IN A FOLDER TO BE TEMPORARILY CHANGED, SYSTEM, METHOD OF CONTROLLING SAME, AND STORAGE MEDIUM

BACKGROUND OF THE INVENTION

Field of the Invention

The present invention relates to an image forming apparatus, a system, a method of controlling the same, and a storage medium.

Description of the Related Art

Preparing a hot folder in a client apparatus for causing an image forming apparatus such as a printer to execute print processing, and when a print target file is stored in the hot folder, automatically transmitting a print job to the printer to cause the printer to print the print job is known conventionally (Japanese Patent Laid-Open No. 2014-219920). With a hot folder, a user of the client apparatus can instruct printing by a relatively simple operation of storing a print target file. Therefore, when making an instruction to print a large amount of print data (many files) with the same print setting for example, the user can be relieved from the complexity of opening individual files using an application such as a printer driver and instructing printing.

Further, in recent years, instead of having the hot folder described above as an application that operates on a client apparatus, a mechanism for providing, as a function of an image forming apparatus such as a printer, an equivalent function—in other words an in-device hot folder—is also known. The in-device hot folder is a mechanism in which a file system and a file server included in the image forming apparatus expose a shared folder to an external client apparatus, and the client apparatus stores a print target file in the shared folder, thereby executing printing. The in-device hot folder can provide further convenience to a user while they enjoy the same operability and convenience as a hot folder operating in a client apparatus. First, there is no need to install an application for implementing the hot folder function on the client apparatus. Second, if a mechanism for accessing the file system of the image forming apparatus is provided, a print environment independent of the operating system can be realized. Third, since print settings of the hot folder are held in the image forming apparatus, there is no need to individually hold or manage hot folder print settings in each client apparatus.

However, there is a problem in the foregoing conventional technique as is described below. According to the mechanism of the in-device hot folder in the conventional technique described above, a hot folder is created by arranging a print setting file in a folder of a file system. Subsequently, when a file is stored in the hot folder, the print setting file is analyzed, and made to be print settings used for printing.

However, in the method of the conventional technique described above, in a case where it is desired to print by a setting other than the default print settings of the hot folder, it is necessary to create a folder and the print settings each time. With respect to items that frequently change in accordance with the file such as a number of copies or a sheet size, when a folder is created each time a setting is made, the number of folders will balloon, and management will be complicated. This complexity of management might lead to mistakes such as performing a print instruction with respect to a folder different to one intended.

SUMMARY OF THE INVENTION

The present invention enables realization of a mechanism that, regarding a print job using a predetermined folder for automatically transmitting a print target file to a printing apparatus when the print target file is stored therein, enables print setting information stored in the folder to be temporarily changed.

One aspect of the present invention provides an image forming apparatus comprising: a memory device that stores a set of instructions and a folder with which print setting information is associated; an image forming unit that forms an image on a sheet; and at least one processor that executes the set of instructions to: transmit, to an external apparatus, screen information for causing to display a screen for accepting a designation of a print file to be transferred to the image forming apparatus in association with the folder, the screen being able to accept a temporary setting to be applied in preference to the print setting information stored in advance in the folder; and cause the image forming unit to execute image formation based on the print file transferred in association with the folder, in accordance with a print setting resulting from preferentially applying a setting item of the temporary setting to the print setting information.

Another aspect of the present invention provides a method of controlling an image forming apparatus having a memory operable to provide a folder with which print setting information is associated, and an image forming unit operable to form an image on a sheet, the method comprising: transmitting, to an external apparatus, screen information for causing to display a screen for accepting a designation of a print file to be transferred to the image forming apparatus in association with the folder, the screen being able to accept a temporary setting to be applied in preference to the print setting information stored in advance in the folder; and causing the image forming unit to execute image formation based on the print file transferred in association with the folder, in accordance with a print setting resulting from preferentially applying a setting item of the temporary setting to the print setting information.

Still another aspect of the present invention provides a non-transitory computer-readable storage medium storing a computer program for causing a computer to execute each step of a method of controlling an image forming apparatus having a memory operable to provide a folder with which print setting information is associated, and an image forming unit operable to form an image on a sheet, the method comprising: transmitting, to an external apparatus, screen information for causing to display a screen for accepting a designation of a print file to be transferred to the image forming apparatus in association with the folder, the screen being able to accept a temporary setting to be applied in preference to the print setting information stored in advance in the folder; and causing the image forming unit to execute image formation based on the print file transferred in association with the folder, in accordance with a print setting resulting from preferentially applying a setting item of the temporary setting to the print setting information.

Yet still another aspect of the present invention provides a system in which an image forming apparatus and an information processing apparatus can communicate, wherein the information processing apparatus comprises: a first memory device that stores a set of instructions; and at least one first processor that executes the set of instructions to: receive, from the image forming apparatus, screen information for causing the information processing apparatus to display a screen for accepting a designation of a print file to be transferred to the image forming apparatus in association with a folder, the screen being able to accept a temporary setting to be applied in preference to print setting information stored in advance in the folder; and notify the image forming apparatus of user input inputted via the screen, and the image forming apparatus comprises: a second memory device that stores a set of instructions and a folder with which print setting information is associated; an image forming unit configured to form an image on a sheet; and at least one second processor that executes the set of instructions to: transmit the screen information to the information processing apparatus; and cause the image forming unit to execute image formation based on the print file transferred in association with the folder, in accordance with a print setting resulting from preferentially applying a setting item of the temporary setting to the print setting information.

Still yet another aspect of the present invention provides a method of controlling a system in which an information processing apparatus can communicate with an image forming apparatus having a memory operable to provide a folder with which print setting information is associated, and an image forming unit operable to form an image on a sheet, the method comprising: the information processing apparatus receiving, from the image forming apparatus, screen information for causing the information processing apparatus to display a screen for accepting a designation of a print file to be transferred to the image forming apparatus in association with the folder, the screen being able to accept a temporary setting to be applied in preference to the print setting information stored in advance in the folder; and notifying the image forming apparatus of user input inputted via the screen, and the image forming apparatus transmitting the screen information to the information processing apparatus; and causing the image forming unit to execute image formation based on the print file transferred in association with the folder, in accordance with a print setting resulting from preferentially applying a setting item of the temporary setting to the print setting information.

Further features of the present invention will be apparent from the following description of exemplary embodiments with reference to the attached drawings.

BRIEF DESCRIPTION OF THE DRAWINGS

FIG. 2A to FIG. 2C are sequence diagrams of the entire system.
FIG. 4A and FIG. 4B are block diagrams illustrating a configuration of a multifunctional peripheral 101.
FIG. 6A and FIG. 6B are views showing examples of a web page having a login function that is to be displayed on a web browser.
FIG. 8A to FIG. 8F are views showing examples of web pages having a print setting creation function that are to be displayed on the web browser.
FIG. 9A to FIG. 9C are schematic diagrams of a folder configuration created in a HDD of the multifunctional peripheral 101.
FIG. 10A to FIG. 10D are schematic diagrams of data transmitted when a temporary setting screen and a temporary setting are valid on the Web browser.
FIG. 13A and FIG. 13B are flow charts showing a sequence of processing by a CPU 501 when an operation is accepted by the web browser.
FIG. 14 is a flow chart showing a sequence of processing by a CPU when a folder display screen request is received.
FIG. 19A to FIG. 19E are schematic diagrams showing changes in a print list stored in a RAM.

DESCRIPTION OF THE EMBODIMENTS

Figure 1:
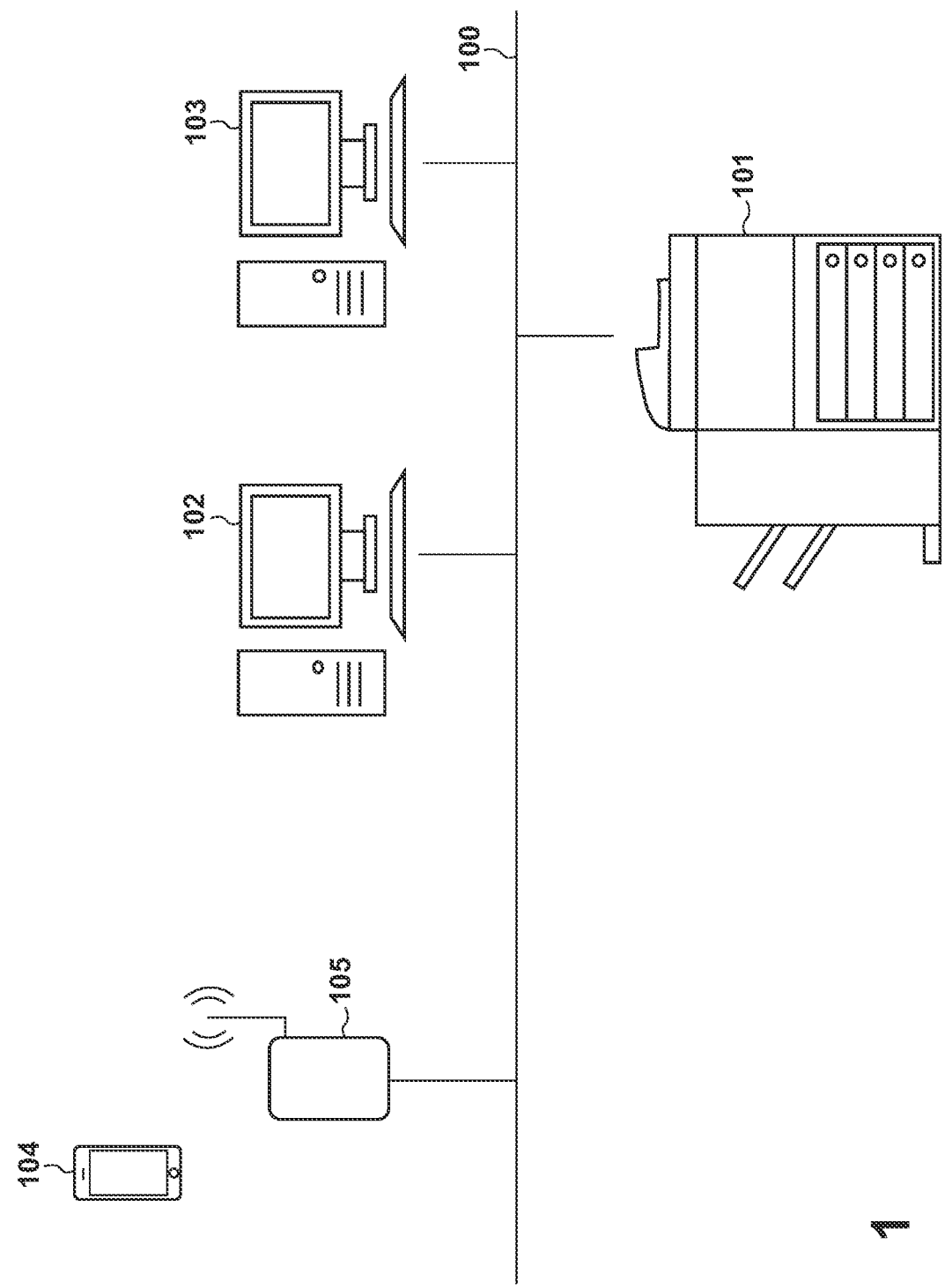
FIG. 1 is a block diagram of a printing system.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that description is given by taking a multifunctional peripheral (digital multifunctional peripheral/MFP/multi function peripheral) as an example of an image forming apparatus according to an embodiment. However, application is not limited to a multifunctional peripheral, and may be to any apparatus that has an image processing function.

First Embodiment

<Configuration of Printing System>
Description is given below regarding a first embodiment of the present invention, with reference to the attached drawings. First, a configuration of a printing system according to the present embodiment will be described with reference to FIG. 1. In the present embodiment, description is given by example in which a multifunctional peripheral 101 (MFP: Multifunction Peripheral) is taken as an example of an image forming apparatus, and a PC or a mobile terminal is taken as an example of a client apparatus which is an information processing apparatus. The multifunctional peripheral 101 and PCs 102 and 103 are communicably connected via a network 100. The PCs 102 and 103 may be systems that operate in accordance with different operating systems. Alternatively, they may be systems that have different versions of the same operating system. In the present embodiment, a printing system environment in which types of client apparatus application execution environments are mixed is assumed.

Further, a wireless LAN access point 105 is connected to the network 100. The wireless LAN access point 105 is configured to be able to communicate with a mobile terminal 104 and various other types of devices (not shown) via a wireless LAN. In this embodiment, devices of a type such as the mobile terminal 104, as a client apparatus equivalent to the PCs 102 and 103, may also be provided with the print environment described below. Such a mobile terminal 104 is rapidly becoming popular, and product diversification is significant. Further, with the popularization of such portable terminals, it is also assumed that, for example, the client apparatus of a user requesting printing from the multifunctional peripheral 101 disposed on the network 100 illustrated in the figure may be a device taken from a public environment.

Next, the PCs 102 and 103 and the mobile terminal 104, which are client apparatuses, will be described. Hereinafter, the PCs 102 and 103, and the mobile terminal 104 are generally referred to as a client apparatus.

The PCs 102 and 103 can execute various programs such as an application program for inputting print jobs. However, in the present embodiment, it is assumed that a printing application program is not installed. It is also assumed that the PCs 102 and 103 have a network file sharing function and a web-information-access function such as a web browser, which are ordinarily present on a modern operating system. By using the above-described web-information-access function, a client apparatus can use the functions of, via the web, mutually transmitting and receiving information and sharing information with a device connected to the network 100. Therefore, the client apparatus can transmit and receive various kinds of data including print target files to and from the multifunctional peripheral 101 by using the web-information-access function.

<Sequence Diagram of the Entire Printing System>

Figure 2A:
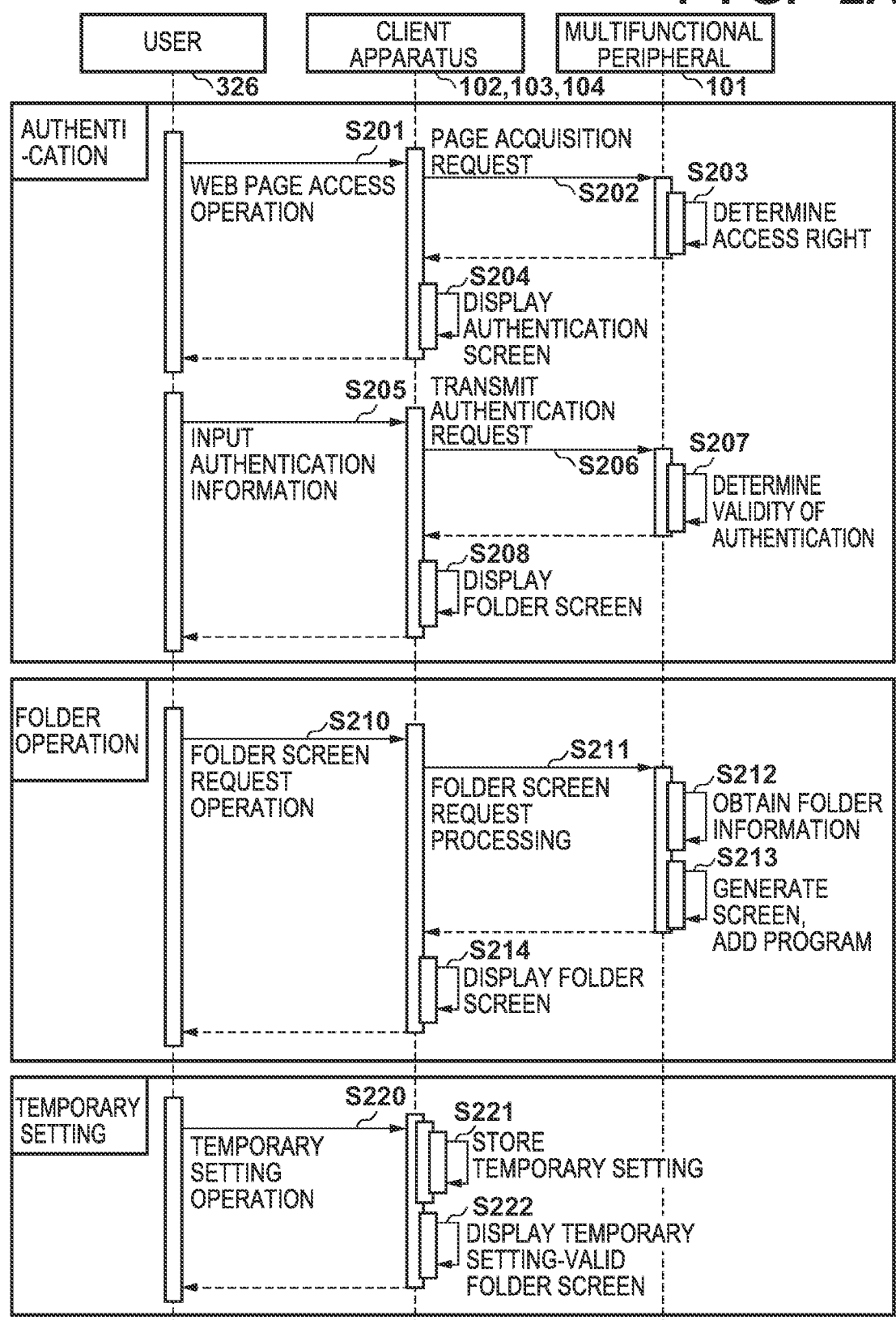

Next, referring to FIG. 2A through FIG. 2C, a description will be given regarding a sequence in which a user 326 authenticates, moves a folder, makes a temporary setting, confirms the setting, and makes an operation to instruct printing, and the files are actually printed. Processing starts when the user 326 shown in FIG. 3 operates a UI unit 301 and requests access to a web server unit 328. Since there is no difference in configuration or control for each client apparatus, description is given taking one device as an example.

First, FIG. 2A will be described. The processing of step S201 to step S208 is a processing flow for when the user 326 operates a web browser app unit 302 via an operation unit 327 of the client apparatus and performs a web page access operation on a web server unit 328 of the multifunctional peripheral 101. A process of authenticating an operator (a user) is executed by an authentication unit 304 via the web server unit 328. Screens to be displayed on the UI unit 301 in the authentication process will be described later with reference to FIG. 8A to FIG. 8F.

In step S201, when the user 326 performs an operation on the UI unit 301 of the client apparatus, the web browser app unit 302 of the client apparatus accepts the operation which is for displaying a web page. This is an operation for instructing acquisition of a web page provided by the in-device hot folder, and specifically, an operation such as inputting an address or selecting a link is performed. Next, in step S202, the web browser app unit 302 performs a page acquisition request to the multifunctional peripheral 101 for an accepted URL. This processing is a normal Web browser process, and is performed by a GET request or the like.

Next, in step S203, the web server unit 328 of the multifunctional peripheral 101 acquires information of the user 326 from the received page acquisition request and determines whether or not they have a right (access right) to access the designated URL. The user 326 can acquire an access right by performing login authentication. The web server unit 328 transmits information of an authentication screen for performing login authentication, if the user has an access right, to the client apparatus.

Next, in step S204, the web browser app unit 302 displays the authentication screen on the UI unit 301 according to the screen information received from the web server unit 328. Next, in step S205, when the user 326 inputs authentication information to the authentication screen displayed on the UI unit 301, the web browser app unit 302 accepts the input information. Thereafter, in step S206, the web browser app unit 302 transmits an authentication request to a URL described in the web page of the authentication screen. The authentication request includes the authentication information inputted from the user 326. Normally, the authentication request is transmitted in an encrypted form.

In step S207, the web server unit 328 acquires the authentication information from the received authentication request, and queries the authentication unit 304 of the multifunctional peripheral 101 as to whether or not the authentication information is valid. The authentication unit 304 compares information of a user DB 305 with the accepted authentication information, and returns a result. If the result from the authentication unit 304 indicates successful authentication, the web server unit 328 notifies the web browser app unit 302 of information of a folder screen together with the authentication result. In step S208, the web browser app unit 302 displays, on the UI unit 301, the folder screen according to the screen information received from the web server unit 328. The folder screen displayed here is a screen of the folder of the highest hierarchy in the hot folder.

Next, a sequence of processing of folder operations shown in step S210 to step S214 will be described. Here, the processing is started from a point where the user 326 operates the folder screen displayed on the UI unit 301 to perform an operation for requesting a folder screen. Folder screens and operations on these screens will be described later using FIG. 7A to FIG. 7E.

In step S210, the web browser app unit 302 of the client apparatus accepts the operation of requesting the folder screen performed by the user 326 operating the folder screen displayed on the UI unit 301. This operation is an operation of any destination folder designation button, an operation of an upper hierarchical movement button 910 shown in FIG. 7A, an operation of designating an address including a folder path directly to the web browser app unit 302, or the like.

Next, in step S211, the web browser app unit 302 transmits a request to the web server unit 328 to acquire information of the designated address. Details will be described later with reference to FIG. 13A to FIG. 14. Next, in step S212, the web server unit 328 of the multifunctional peripheral 101 detects a request for a folder screen. Further, the web server unit 328 acquires a folder path from the received folder screen request, and acquires a file list of the folder via the file system unit 329. Then, the web server unit 328 determines whether or not a file having a predetermined print setting file extension is included in the acquired file list. Details will be described later with reference to FIG. 14.

Next, in step S213, the web server unit 328, by a page generation unit 306, generates a folder screen based on the acquired folder information. In addition, the page generation unit 306 adds a temporary setting screen display program or a print file transmission program that is held in advance to the generated screen information.

In step S214, the web browser app unit 302 displays the folder screen on the UI unit 301 according to the information received from the web server unit 328. The folder screen will be described later with reference to FIG. 8A to FIG. 8F.

Next, a sequence of processing for a temporary setting shown in step S220 to step S222 will be described. Here, the processing is started from a point where the user 326 operates the folder display screen displayed on the UI unit 301 to perform an operation for designating a temporary setting. In step S220, the web browser app unit 302 accepts a user operation where the user selects, via the folder display screen displayed on the UI unit 301, a temporary setting screen to input a temporary setting. Next, in step S221, the web browser app unit 302 stores the inputted temporary setting. Further, in step S222, the web browser app unit 302 updates the screen with the temporary setting as valid, and displays the folder display screen onto which the valid temporary setting is superimposed on the UI unit 301.

Next, FIG. 2B will be described. Description is given for a sequence of processing a request for a print setting confirmation screen, indicated by step S230 through step S236. This is a sequence of processing that starts from when the user 326 operates the folder display screen displayed on the UI unit 301 to perform an operation to request a print setting confirmation screen, and goes until the print setting confirmation screen is displayed. The print setting confirmation screen is described later using FIG. 11A to FIG. 11C.

In step S230, the web browser app unit 302 accepts a request for the print setting confirmation screen which is performed by the user 326 operating the folder display screen displayed on the UI unit 301. Next, in step S231, the web browser app unit 302 performs processing for requesting the print setting confirmation screen. In this processing, transmission of data including a setting designated by the temporary setting and the path of the folder displayed by the folder display screen to the web server unit 328 is performed.

In step S232, the hot folder function unit 321 acquires a folder path that the web server unit 328 retrieved from the print setting confirmation screen request, and acquires a print setting file inside the folder via the file system unit 329. Further, analysis of the acquired print setting file is performed by the job registration requesting unit 323. Next, in step S233, the job registration requesting unit 323 applies the temporary setting that the web server unit 328 retrieved from the print setting confirmation screen request to a result of analyzing the print setting file. Next, in step S234, the job registration requesting unit 323 performs a consistency check on the result of analyzing the print setting file to which the temporary setting was applied. Further, in step S235, the page generation unit 306 receives, from the job registration requesting unit 323, the result of analyzing the print setting file to which the temporary setting is applied and a result of the consistency check. Further, the page generation unit 306, if no error has occurred, creates web pages for the confirmation screens 1300 and 1310, and if an error has occurred, creates a web page for a print setting error screen 1320. Generated information is transmitted to the client apparatus.

In step S236, the web browser app unit 302 displays, on a display unit, the print setting confirmation screen or the print setting error screen received from the web server unit 328.

Next, a sequence of processing for a print request setting shown in step S240 to step S244 will be described. Here, the processing is started from a point where the user 326 operates the folder display screen displayed on the UI unit 301 to perform a print instruction operation.

In step S240, the web browser app unit 302 accepts a print instruction operation which is performed by a user operating the folder display screen displayed on the UI unit 301. This operation is for dragging-and-dropping a file to a folder type display area 908. Next, in step S241, the web browser app unit 302 performs processing for making a print request to the web server unit 328. This processing uses normal web browser functions, such as a POST request. The print request processing includes a file for which a print instruction was received, a temporary setting, and the folder path of the folder display screen.

In step S242, the web server unit 328 detects the received print request, and calls the hot folder function unit 321 to register the print request in the print list stored in the RAM 402. To the print request to be registered, an ID is added as information associated with request, and the print request includes the temporary setting and an accepted folder path in association. In step S243, the web server unit 328 reads file from the print request, and stores it in the HDD 404 via the file system unit 329. Further, in step S244, the hot folder function unit 321 adds the file path of the saved file to the print request registered to the print list in step S223.

Next, FIG. 2C will be described. A sequence of processing for print processing shown in step S250 to step S255 will be described. Here, processing starts from when the hot folder function unit 321 detects that the print list has been updated. In step S250, the hot folder function unit 321 detects that the print list stored in the RAM 402 has been updated. Step S251 to step S255 are repeated until there is no print request in the print list, or a file path for a first print request is not registered.

In step S251, the hot folder function unit 321 acquires the first print request of the print list. When there is no print request in the print list, or when the file path of the first print request is not registered, the processing ends. Next, in step S252, the hot folder function unit 321 acquires the folder path from the print request, and acquires the print setting file in the folder through the file system unit 329. Analysis of the acquired print setting file is performed by the job registration requesting unit 323. Next, in step S253, the job registration requesting unit 323 acquires a temporary setting from the print request, and applies it to a result of analyzing the print setting file. In step S254, the job registration requesting unit 323 performs a consistency check on the result of analyzing the print setting file to which the temporary setting was applied. In step S255, the hot folder function unit 321 acquires the file path from the print request, and reads the file through the file system unit 329. The job registration requesting unit 323 transmits a job registration request to a job registering unit 320 using the result of the analysis and the read file. At the same time, the print request is deleted from the print list stored in the RAM 402.

Next, a sequence of processing for recording a result shown in step S260 to step S261 will be described. Here, the processing is started from when a print queue management unit 319 detects the completion of printing. Processing for step S260 and step S261 will be described later in detail with reference to FIG. 15.

In step S260, the print queue management unit 319 detects print completion (job completion) from a printer unit 314 and notifies a print result management unit 331 of the print completion. Next, in step S261, the print result management unit 331 receives the print completion notification and registers a print result in a print history stored in the RAM 402.

<System Configuration>

Figure 3:
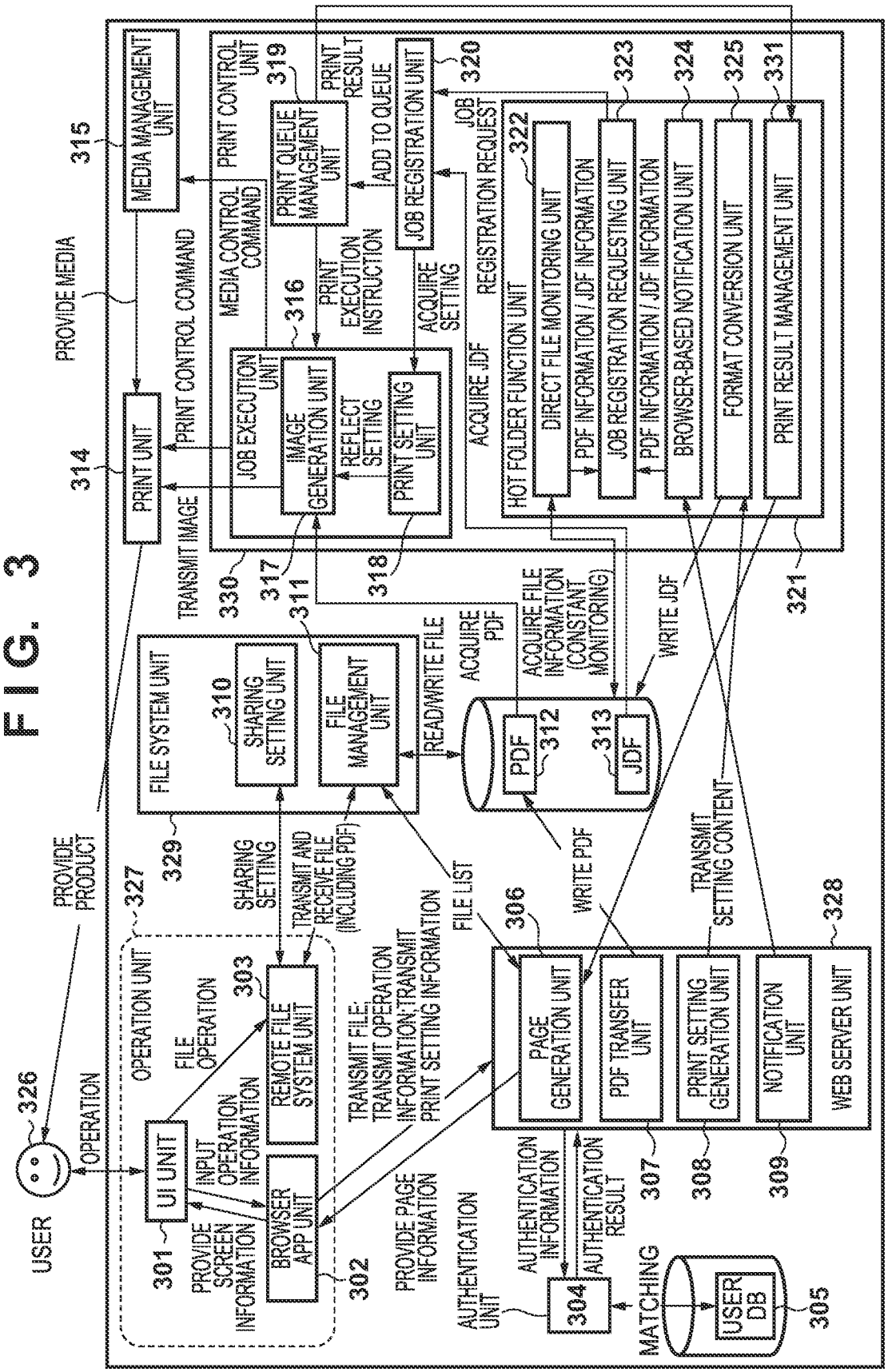
FIG. 3 is a system configuration diagram of an in-device hot folder.

Next, a functional configuration of the hot folder printing system according to the present embodiment will be described with reference to FIG. 3. As shown in FIG. 3, the printing system can be represented by a collection of a plurality of functional modules. Each module may be implemented by hardware or software. In addition, configuration may be taken such that some of the functional modules are arranged in an external server (not shown) and functionality is realized by communication with the external server. Note that the same reference numerals are used for portions common to those in FIG. 2, and descriptions thereof are omitted. Furthermore, functional modules which configure respective systems, processes of the functional modules, and relationships between functions will be described here.

The printing system includes the above-described operation unit 327, the web server unit 328, the file system unit 329, a print control unit 330, the printer unit 314, the authentication unit 304, and the like. The operation unit 327 includes the UI unit 301, the web browser app unit 302, and a remote file system unit 303. The UI unit 301 is a functional unit provided for instructing display of image information and input and output of data, and accepting an operation instructions. Content of an operation by the user 326 is reflected to the web browser app unit 302 and the remote file system unit 303.

The web browser app unit 302 is a functional unit that presents screen information by displaying web content on a window screen on the UI unit 301. The web browser app unit 302 performs processing for transmitting and receiving information to and from the web server unit 328, which will be described later. Screen information is mainly provided from the web browser app unit 302 to the UI unit 301.

The remote file system unit 303 is a functional unit for operating folders and files in the multifunctional peripheral 101 by using file system functionality provided by the client apparatus. The remote file system unit 303 accesses a file management unit 311 to perform various operations under the access right and based on the setting information of a sharing setting unit 310. Sharing setting information is exchanged between the remote file system unit 303 and the sharing setting unit 310. More specifically, the following operations are possible by using remote file system functionality. For example, this corresponds to execution of processing derived from a file system, such as the acquisition of information on a folder hierarchy, information on a path, list information of subfolders and files under a folder, folder creation/deletion processing, and file creation/deletion processing. Also, an in-device hot folder function includes, for example, processing for transmitting a file in a PDF format, which is print target data. However, as will be described later, the in-device hot folder in the present invention is characterized in that a print-related instruction is executed via the web server unit 328 instead of the operation unit 327 directly executing a print-related instruction with respect to the file system unit 329.

The web server unit 328 is a functional unit that the multifunctional peripheral 101 has, and is for providing a web service to an external apparatus. The web server unit 328 executes a series of processes for receiving various demands, that is, requests from an external unit, and returning a result of executing a process corresponding to the content of a request to the external apparatus in the form of page information.

The web server unit 328 includes the page generation unit 306, a PDF transfer unit 307, a print setting generation unit 308, and a notification unit 309. The page generation unit 306 is a module for generating page information for providing a result of executing an accepted request to an external apparatus. When the web server unit 328 receives a PDF-format file, which is print target data, from an external apparatus, the PDF transfer unit 307 executes processing to store the received file. More specifically, the file management unit 311 executes a process of storing a PDF 312 via the file system unit 329.

The print setting generation unit 308 is a module that executes a process for a case where the web server unit 328 receives from an external apparatus a request that includes print settings. This corresponds to a case where the web server unit 328 receives a set of print settings that corresponds to a folder in a hot folder creation process. In this case, the print setting generation unit 308 uses a format conversion unit 325 provided in the hot folder function unit 321 to make a conversion to a JDF-format file 313, and then stores the converted data via the file management unit 311 which is managed by the file system unit 329.

As described above, the print result management unit 331 receives a print completion notification from the print queue management unit 319, and registers a print result in the print history stored in the RAM 402.

The notification unit 309 is a module for generating a notification event between modules when the web server unit 328, triggered by accepting a web request from an external apparatus, executes a process inside the multifunctional peripheral 101. Specifically, the hot folder function unit 321 is a module that controls timings of the execution of a series of processes such as print processing, a folder hierarchy moving process, and processes for generating and replying with rendering information associated therewith, in response to requests received by the web server unit 328.

The web server unit 328, in conjunction with the authentication unit 304, is further capable of executing an authentication process for realizing user access control with respect to web services provided via the web server unit 328. When executing the authentication process, the web server unit 328 performs matching against the user DB 305 included in the authentication unit 304, based on the received user information, and determines whether authentication succeeded. Control is performed so that only when a user is successfully authenticated are they permitted to use various web services provided via the web server unit 328.

The print control unit 330 is a module responsible for a series of controls for controlling the printer unit 314 and a media management unit 315 included in the multifunctional peripheral 101, performing image formation onto a sheet for print target data, and processing the sheet. The print control unit 330 is further divided into a plurality of sub modules such as a job execution unit 316, the print queue management unit 319, the job registering unit 320, and the hot folder function unit 321.

The job execution unit 316 is a module that collectively manages and executes print control that is generated in the multifunctional peripheral 101 in a unit of print data called a job. The print queue management unit 319 is a module for managing an execution order by adding an order to respective jobs managed by the job execution unit 316. The hot folder function unit 321 is a module for realizing a hot folder function. Print jobs generated by the hot folder function unit 321 are stored in the print queue management unit 319, via the job registering unit 320, in the order in which they were generated.

The print queue management unit 319 instructs the job execution unit 316 to execute the first job of jobs that the print queue management unit 319 manages. Specifically, first, an image generation unit 317 rasterizes image data such as the PDF 312, which is a print target of the job. A print setting unit 318 analyzes print settings and media settings written in the JDF (Job Definition Format) 313 or the like. Further, the job execution unit 316 controls the printer unit 314 and the media management unit 315, and performs a process of forming an image of the above rasterized image data on a sheet in accordance with analyzed commands. As a result, a series of product generation processes is executed. When the product generation process by the job execution unit 316 completes, the print queue management unit 319 is controlled to sequentially execute similar control for the next jobs. Such processes are controlled to be processed in order until all of the jobs managed by the print queue management unit 319 have been completed.

The hot folder function unit 321 is a module for realizing the in-device hot folder function in the multifunctional peripheral 101, and is a function provision unit. A function group configured by the in-device hot folder function provided by the hot folder function unit 321 includes a process related to creating a hot folder, a process related to executing an inputted print job, and a process of setting the in-device hot folder function itself. Further, the function group includes a process of presenting an operation screen to the operation unit 327 in order for these functions to be instructed.

Further, the in-device hot folder function of the present embodiment is characterized in that print target data is received via the web server unit 328. Therefore, execution of a print job is instructed by a browser-based notification unit 324 receiving a print processing execution trigger from the notification unit 309, which is managed by the web server unit 328, and the job registration requesting unit 323 registering it in the job registering unit 320.

<Configuration of Multifunctional Peripheral>

Next, referring to FIG. 4A and FIG. 4B, the configuration of the multifunctional peripheral 101 will be described. FIG. 4A shows a hardware configuration of the multifunctional peripheral 101, and FIG. 4B shows a software configuration of the multifunctional peripheral 101. The multifunctional peripheral 101 has a reading function of reading an image on a sheet and a print function of printing an image onto a sheet. The multifunctional peripheral 101 has a post-processing function of binding a plurality of sheets onto which images have been printed, aligning a plurality of sheets, and dividing a discharge destination of a plurality of sheets among a plurality of trays. A sheet includes paper such as plain paper or cardboard, a film sheet, and the like.

Further, the multifunctional peripheral 101 has a file sharing function that can be used from a client apparatus such as the PCs 102 and 103, and the mobile terminal 104. The file sharing function that the multifunctional peripheral 101 has is configured to be usable through the web-information-access function described above. Details of the file sharing function, the web-information-access function, a program configuration for providing these functions in each device, and usage methods that involve these will be described later. It should be noted that the functionality of the multifunctional peripheral according to the present invention is not intended to be limited to these functions, and other functions, for example, a function of transmitting image data or the like, may be included.

The multifunctional peripheral 101 includes a controller 400, a scanning device 409, a print device 410, a sheet feeding device 411, a sheet-processing device 412, an operation device 413, and an external storage 414. The controller 400 includes a CPU 401, a RAM 402, a ROM 403, a HDD 404, a RIP circuit 405, a compression/expansion circuit 406, a NIC 407, and an interface 408. The multifunctional peripheral 101 is a device for conveying a medium (e.g., paper or sheet) contained in the sheet feed unit, and forming an image of expanded image data onto the medium using toner. Configuration is such that apparatuses having a plurality of different roles are connected to each other so as to enable complicated sheet processing. The multifunctional peripheral 101 according to the present invention includes a non-volatile memory such as the hard disk drive (also referred to below as HDD) 404 that is capable of storing data of a plurality of jobs that are to be processed in the device. In the present embodiment, description is given by taking as an example the multifunctional peripheral 101 which uses a hard disk, but there is no limitation to a hard disk as long as there is a similar large-capacity non-volatile storage apparatus.

The multifunctional peripheral 101 is provided with a copying function for printing, by the print device 410 and via the HDD 404, job data accepted from the scanning device 409. Further, the multifunctional peripheral 101 is provided with a print function of printing job data accepted from an external apparatus via the interface 408 by the print device 410 via the HDD 404, and the like. The multifunctional peripheral 101 according to the present invention is an MFP-type printing apparatus (also referred to as an image forming apparatus) having a plurality of functions. As long as various controls described in the present embodiment can be executed, the multifunctional peripheral 101 of the present embodiment may have any configuration, and may be a printing apparatus capable of color printing or a printing apparatus capable of monochrome printing.

The scanning device 409 reads a document image and performs image processing on the read image data. The interface 408 transmits and receives image data and the like to and from a facsimile machine, a network connected device, or an external dedicated device. The HDD 404 stores image data of a plurality of jobs to be printed, accepted from one of the scanning device 409 and the interface 408. Therefore, the multifunctional peripheral 101 according to the present embodiment can print, by the print device 410 via the HDD 404, job data accepted from the scanning device 409 (copying function). Further, the multifunctional peripheral 101 can print, by the print device 410 via the HDD 404, job data accepted from an external apparatus via the interface 408 (print function). The multifunctional peripheral 101 according to the present invention is an MFP-type printing apparatus (also referred to as an image forming apparatus) having a plurality of functions.

The HDD 404 also stores, for example, various types of management information that are permanently stored, changed, and managed by the multifunctional peripheral 101 according to the present invention. The print device 410 executes a process for printing, on a print medium, data of a job to be printed, which is stored in the HDD 404. The operation device 413 is a display unit corresponding to an example of a user interface.

The CPU 401 collectively controls processes, operations, and the like of various units included in the multifunctional peripheral 101. The ROM 403 stores various control programs required by the present embodiment, including programs for executing various processing of flowcharts to be described later. The ROM 403 also stores display control programs for displaying various UI screens on the display unit of the operation device 413, including user interface screens (hereinafter referred to as UI screens) that are illustrated.

The CPU 401 causes the multifunctional peripheral 101 to execute various operations described in the present embodiment by reading and executing programs of the ROM 403. The ROM 403 is a read-only memory in which programs such as a boot sequence and font information, and various programs such as the above-mentioned programs are stored in advance. In addition, the ROM 403 stores a file server function program for exposing the file system provided by the multifunctional peripheral 101 and making it accessible to client apparatuses. The ROM 403 also stores a web program and the like for providing functionality based on a web page via a web server provided in the multifunctional peripheral 101 that is accessed using a web browser. The ROM 403 also stores an in-device hot folder program that provides the in-device hot folder function to a client apparatus via a web access function. The various programs stored in the ROM 403 will be described later in detail.

The RAM 402 is a memory that can be read from and written to, and stores image data, various programs, and setting information transmitted from the scanning device 409 or the interface 408. The HDD 404 is a large-capacity storage apparatus that stores image data compressed by the compression/expansion circuit 406, raster image data acquired by the RIP circuit 405 expanding print data, and the like. The HDD 404 holds a plurality of pieces of data such as print data of jobs to be processed. The CPU 401 controls data of a job to be processed, which is input via various input units such as the scanning device 409 and the interface 408, so that the data of the job can be printed by the print device 410 via the HDD 404. The CPU 401 also controls to enable transmission to an external apparatus via the interface 408. In this manner, the CPU 401 performs control so as to be able to execute various types of outputting processing on data of jobs to be processed that are stored in the HDD 404. Further, the CPU 401 is configured to be able to, for a file system constructed inside the HDD 404, realize functionality of performing file sharing or transmission/reception with respect to an external apparatus, by reading out and executing programs from the ROM 403.

The RIP circuit 405 includes a RIP (Raster Image Processor) circuit for converting received print data into raster image data. The compression/expansion circuit 406 performs compression and decompression operations on image data or the like that is stored in the RAM 402 or the HDD 404 by various compression methods such as JBIG or JPEG. With the above-described configuration, the CPU 401 as an example of a control unit included in the present printing system also controls the operation of the sheet-processing device 412.

The NIC 407 is a Network Interface Card that is connected to the LAN and is for inputting and outputting image data and apparatus information. The interface 408 is, for example, a serial bus interface for USB, a LAN, or the like, and is connected to the scanning device 409 and the print device 410. The scanning device 409 is a scanner that includes an auto document feeder. Light is irradiated onto a bundle of document images or a document image of one sheet by a light source (not shown), and an original reflected image is formed on a solid-state imaging device such as a CCD (Charge Coupled Device) sensor by a lens. Then, a raster image reading signal is acquired as image data from the solid-state imaging device. The image data is transferred via the interface 408, and stored in the HDD 404.

The print device 410 is a part for forming an image onto a sheet, and a typical operation principle is as follows. A light beam such as a laser beam modulated in accordance with image data is caused to be incident on a rotating polygonal mirror (a polygonal mirror), and irradiated onto a photosensitive drum as reflected scanning light through a reflecting mirror. A latent image formed on the photosensitive drum by the laser beam is developed by toner, and the toner image is transferred to the sheet material, in other words the medium, adhered to the transfer drum. The series of image formation processes is sequentially executed for yellow (Y), magenta (M), cyan (C), and black (K) toners, thereby forming a full color image. Configuration may be taken such that, in addition to the four colors, a toner referred to as a special color, a transparent toner, or the like can be transferred. The sheet material on the transfer drum onto which the full-color image is formed is then conveyed to a fixing device. The fixing device is composed of a combination of a roller and a belt, and incorporates a heat source such as a halogen heater, and, by heat and pressure, melts and fixes the toner onto the sheet material onto which the toner image was transferred.

The sheet feeding device 411 is a device including a cassette or a tray for storing media such as paper or OHP sheets that are used for printing, and feeds stored media to the print device 410. The sheet-processing device 412 is an apparatus for acquiring a product acquired by performing various processes on a medium after image formation by the print device 410. The various types of processing include stapling processing in which the ends of a bundle of media conveyed to the sheet-processing device 412 are closed with staples, and the like. Also included is a bookbinding process in which a center portion of a bundle of media similarly conveyed to the sheet-processing device 412 is bound by staples and folded along the staples. In addition, a stapleless binding process or the like is included in which the end of a bundle of media conveyed to the sheet-processing device 412 is closed by applying pressure with a tooth pattern. Further, punching processing for performing a punch pressing process at an end of a medium conveyed to the sheet-processing device 412 is included.

The operation device 413 provides various interfaces for when an operator performs various settings and operations of the multifunctional peripheral 101 according to the present invention.

Next, referring to FIG. 4B, the configuration of the software (programs) of the multifunctional peripheral 101 will be described. These programs are stored in the ROM 403, read out by the CPU 401 of the multifunctional peripheral 101, and executed.

A boot loader 601 is a program that is executed immediately after the power of the multifunctional peripheral 101 is turned on. These programs include programs for executing various startup sequences necessary for startup of the system. An operating system 602 is a program whose purpose is to provide an execution environment for various programs for realizing the functions of the multifunctional peripheral 101. This mainly provides the functions of managing the memories of the multifunctional peripheral 101, namely resources such as the ROM 403, the RAM 402, and the HDD 404, and basic input/output control of the other components shown in FIG. 4A and FIG. 4B.

A network control program 603 is a program that is executed when data is transmitted to or received from a device connected via a network. This program is used at the time of execution of various processes such as reception processing of a file to be printed, transmission of data from an external apparatus, transmission and reception of commands, and the like. The network control program 603 also includes a driver program for controlling the NIC 407.

A file system server 604 is a server program for providing an external apparatus connected via a network with the ability to make requests for file creation, transmission, reception and the like, with respect to files in the HDD 404 of the multifunctional peripheral 101. By the program being activated and operating, an external apparatus such as the PCs 102 and 103 and the mobile terminal 104 which are connected to the network can, via the network, use files in the HDD 404 and services provided by the file system.

A web server 605 is a program for providing a server function in which a web service provided in accordance with web content and a web program comprised by the multifunctional peripheral 101 can be used by an external apparatus such as the PCs 102 and 103 and the mobile terminal 104 which are connected via the network. A hot folder function program 606 is a characteristic program that is provided by the multifunctional peripheral 101 according to the present invention. Specifically, this program, by the web server 605, detects reception of a request for a web service from a client apparatus connected to the network. Further, the program executes a series of functions provided as the in-device hot folder function in response to the detected reception of the request.

A JDF function program 607 is a program for executing a JDF print function executed by the CPU 401 in response to an instruction from the NIC 407 when JDF job data is received. In the JDF print function, the CPU 401 sequentially instructs the operation of respective devices described by FIG. 4A and FIG. 4B in an appropriate order based on a processing order and a processing condition written in this program. These devices include the sheet-processing device 412, the print device 410, the HDD 404, the compression/expansion circuit 406, the RAM 402, and the like. The program also includes a process for analyzing JDF job data received via the NIC 407, a process of determining, as a result of the analysis process, whether or not a setting that is incorrect for JDF is included, and program processing for performing, for example, a setting change for resolving an incorrect setting.

A PDL print function program 608 executes a PDL print function which is executed by the CPU 401 when PDL data (print job data) is received. In the PDL print function which is performed by the CPU 401, the CPU 401 sequentially instructs the operation of respective devices described by FIG. 4A and FIG. 4B in an appropriate order based on a processing order and a processing condition written in this program. These devices include the sheet-processing device 412, the print device 410, the HDD 404, the compression/expansion circuit 406, the RAM 402, and the like.

A media management program 609 is a program for executing a management function related to sheets that can be used by the multifunctional peripheral 101. Sheet-related information managed by the program is stored in the HDD 404. A user authentication program 610, based on usage rights setting information of a user who uses the multifunctional peripheral 101, executes control for limitation and permission/prohibition of usage of the multifunctional peripheral 101 and the functions that it provides. The user authentication program 610 firstly executes an authentication process, and based on the result of the authentication process, executes the above-described function usage permission/prohibition, processing for controlling usage, and the like. The authentication process can be performed via the operation device 413 provided in the multifunctional peripheral 101, or via web screens provided through a Web browser on the PCs 102 and 103, the mobile terminal 104, or the like.

A print job queue management program 611 is a program responsible for job generation through print processing, post-printing processing, generation of job management information that includes confirmation of a job status in the course thereof, and the like. Specifically, the above-described JDF function program 607, PDL print function program 608, hot folder function program 606, and the like each receive a print request, generate a print job, and manage the life cycle of processing for executing the generated print job. These programs also includes a process of managing execution order in accordance with an order of job execution requests with respect to a region of the HDD 404 or the like temporarily, in order to sequentially process job data generated in the multifunctional peripheral 101. Other programs 612 is a generic name for programs that are not included in any of the above-described programs that are stored in the ROM 403 and can be executed by the multifunctional peripheral 101. Since these are not important for explaining the effect of the present invention, explanation thereof is omitted.

<Client Apparatus Hardware Configuration>

Figure 5A:
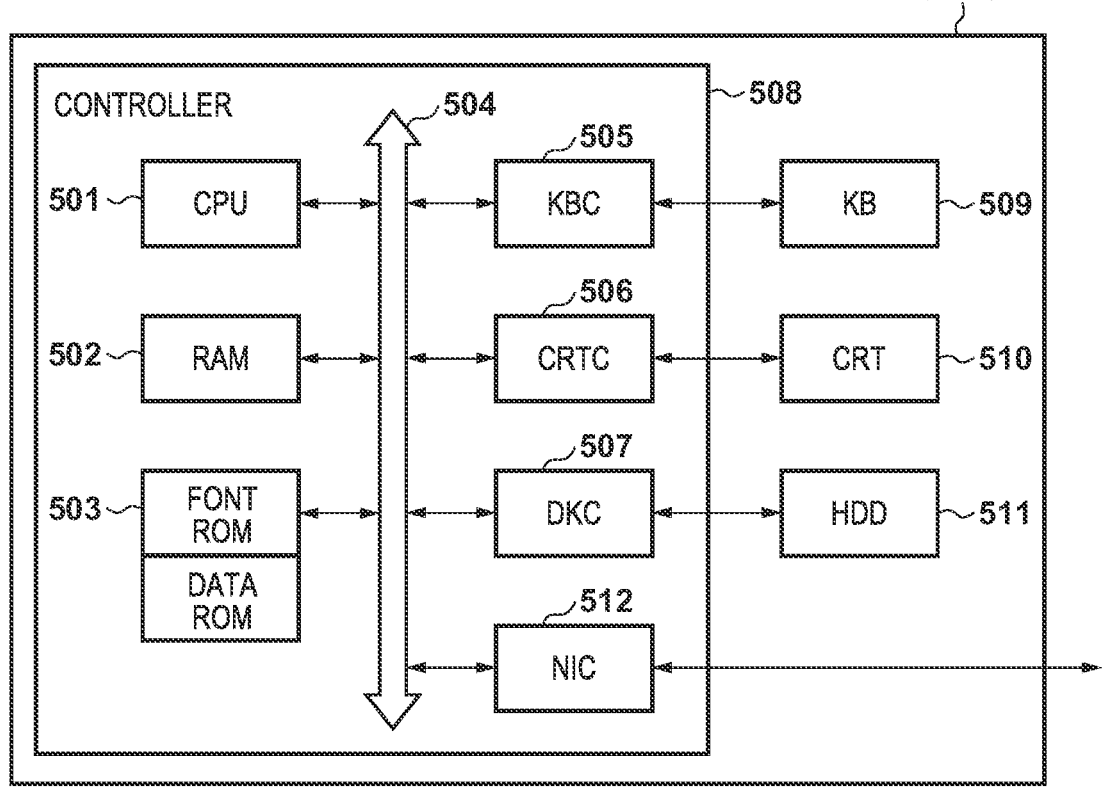
FIG. 5A and FIG. 5B are block diagrams for explaining a configuration of a client apparatus.
Figure 5B:
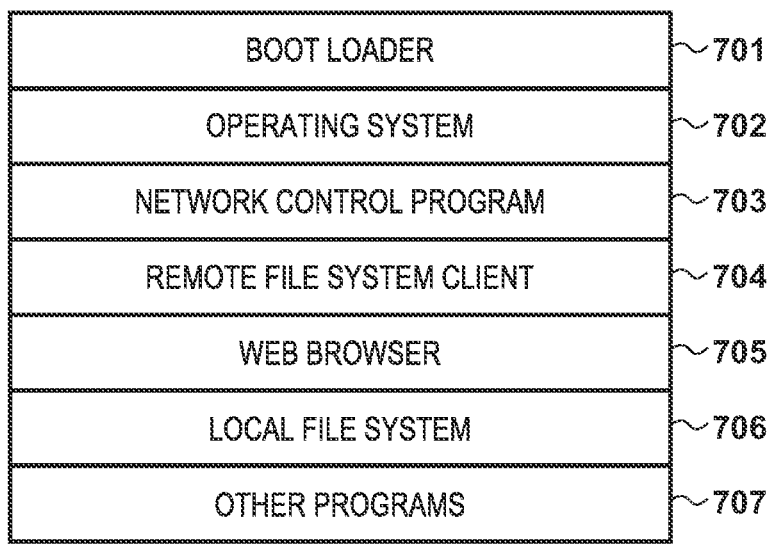

Next, referring to FIG. 5A and FIG. 5B, a configuration of a client apparatus, that is the PCs 102 and 103 and the mobile terminal 104 in FIG. 1, will be described. FIG. 5A shows a hardware configuration of the client apparatus, and FIG. 5B shows a software configuration of the client apparatus. The client apparatus includes a controller 508, a keyboard (KB) 509, a display unit (CRT) 510, and a HDD 511. The controller 508 includes a CPU 501, a RAM 502, a ROM 503, a keyboard controller 505, a display controller (CRTC) 506, a disk controller 507, and a NIC 512. These components are connected through a bus 504 so that they can transmit signals to each other.

The CPU 501 executes a program stored in a program ROM of the ROM 503, and an OS or general application program loaded from the HDD 511 to the RAM 502. The ROM 503 also has a font ROM and a data ROM. The RAM 502 functions as a main memory, a work area, and the like of the CPU 501. The keyboard controller (KBC) 505 controls input from a keyboard or a pointing device (not shown). The display controller (CRTC) 506 controls display with respect to the display unit (CRT) 510. The disk controller (DKC) 507 controls accesses to the HDD 511 which stores a boot programs, various applications, font data, and the like. The network controller (NIC) 512 is connected to a network and executes communication control processing with respect to another device connected to the network. The bus 504 is connected to the CPU 501, the RAM 502, the ROM 503, various controllers, and the like, and conveys data signals and control signals.

In the case of a mobile terminal, a touch panel controller or the like may be included in the configuration instead of the keyboard controller (KBC) 505. In addition, a large-capacity storage apparatus may be provided instead of the HDD 511. Further, the network controller (NIC) 512 has an internal configuration that differs between the cases where the apparatus includes a wired LAN, includes a wireless LAN, or includes both. However, the differences due to these internal configurations are concealed inside the network controller (NIC) 512, and the system can be controlled as equivalent to the other modules shown in the same figure.

Next, referring to FIG. 5B, the configuration of software (programs) held by the PCs 102 and 103 and the mobile terminal 104, which are client apparatus, will be described.

A boot loader 701 indicates programs that are executed immediately after the power of the PCs 102 and 103 and the mobile terminal 104 is turned on. These programs include programs for executing various startup sequences necessary for startup of the system. An operating system 702 is a program whose purpose is to provide an execution environment for various programs for realizing the functions of the PCs 102 and 103 and the mobile terminal 104. This provides functions such as for resource management of the memories of the PCs 102 and 103 and the mobile terminal 104, that is, the ROM 503, the RAM 502, the HDD 511, and the like.

A network control program 703 is a program that is executed when data is transmitted to and received from a device connected via a network. This program can be used when a file system executes transmission of a file to be printed. A remote file system client 704 and the web browser 705, which will be described later, are used subordinately when the functions provided by the file system server 604 and the web server 605 held by the multifunctional peripheral 101 connected via the network are used.

The remote file system client 704 is a program that operates on the client apparatus side when executing processing for transmitting or receiving a file to or from an external device, such as the multifunctional peripheral 101 connected via the network, using the network control program 703. This program is for executing processing on the client when accessing a function of a file server provided by an external device connected via a network, to use the function of the file server. The remote file system client 704 accesses a file server provided by an external device connected to the network via the network controller (NIC) 512, and enables file transmission, reception, copying, and the like.

The web browser 705 is a client program for a case of using a web service that is provided by an external apparatus and is operated by the web server 605, where the external apparatus is an external device connected via the network. The web browser 705 may be provided in advance in the apparatus as a part of the functions of the operating system, in the case of a general-purpose operating system. On the other hand, since a web browser is also an application program that operates on a general-purpose client apparatus, it is also conceivable that a user of the client apparatus could install and use any web browser application. In the present embodiment, the form in which the web browser 705 is provided on the client apparatus is not relevant.

A local file system 706 is a file management function program that executes file management such as creation, editing, deletion, and the like of various files stored in the HDD 511. In combination with the remote file system client 704 described above, the file system server 604 of an external apparatus connected via the network is accessed, and a file managed by the file system is copied to a remote apparatus (external apparatus). A network file management function such as the reverse of above: copying a file on the remote apparatus side to the local file system 706, is realized.

Other programs 707 includes a group of programs that do not correspond to any of the above, but detailed description thereof is omitted. Note that there may be a form in which various programs such as the above-described local file system 706, remote file system client 704, network control program 703, and web browser 705 are provided as a part of the operating system 702. Irrespective of whether or not the operating system 702 includes the various functions described above as its own functions, the present invention applies as long as the client apparatus has these functions.

Correspondence among the software/hardware configurations provided by the respective systems of the client apparatus (102, 103, 104), and the multifunctional peripheral 101 shown in FIG. 3 to FIG. 5B and described above, is as described below. The operation unit 327 is realized by the CPU 501 executing the web browser 705 together with control of input/output devices such as the KB 509, the CRT 510, the CRTC, and the KBC 505. The web server unit 328 is realized by the CPU 401 executing the web server 605. The file system unit 329 is realized by the CPU 401 executing the file system server 604 and the network control program 603.

The printer unit 314 is realized by the CPU 401 executing the JDF function program 607 and the CPU 401 controlling various print devices, in other words the print device 410, the compression/expansion circuit 406, and the sheet-processing device 412. The media management unit 315 is a functional unit that controls a sheet in a manner suitable for an image forming process performed by the printer unit 314. The media management unit 315 is realized by the CPU 401 executing the media management program 609 and controlling the sheet feeding device 411 and the sheet-processing device 412.

The hot folder function unit 321 is realized by the CPU 401 executing the hot folder function program 606. The job execution unit 316 is realized by the CPU 401 executing the JDF function program 607. The print queue management unit 319 and the job registering unit 320 are realized by the CPU 401 executing the print job queue management program 611.

<Description of Web Browser Screen for Login>

Next, with reference to FIG. 6A and FIG. 6B, description will be given for an initial screen that is displayed on a web browser screen as a result of a web request transmitted to the multifunctional peripheral 101 when the web server 605 uses the hot folder function program 606.

When the PCs 102 and 103 and the mobile terminal 104 access the hot folder function program 606 included in the multifunctional peripheral 101 via the web browser 705, an authentication request screen shown in FIG. 6A is first displayed on the web browser screen. This screen displays a user name field 801 for information necessary for authentication, a password input field 802 corresponding to the user name, a login destination, in other words an authentication server selection field 803, and a login button 804.

When the user of the hot folder function program has appropriately inputted user information, as shown in FIG. 6B, into the respective fields provided by these screen and then presses the login button 804, the authentication process is executed by the user authentication program 610. The authentication information required for the authentication process of the user authentication program 610 is transmitted from the web browser 705 to the user authentication program 610 via the web server 605 of the multifunctional peripheral 101 through the network.

<Description of Web Browser Screen for Folder Display>

Next, referring to FIG. 7A to FIG. 7E, description is given of examples of the in-device hot folder function screen displayed on the web browser screen when authentication is successful.

Figure 7A:
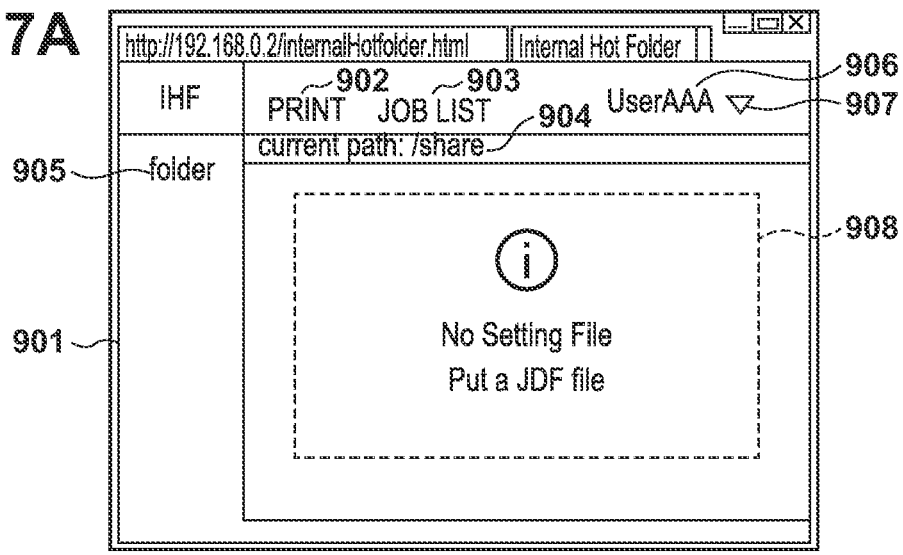
FIG. 7A to FIG. 7E are views showing examples of web pages, to be displayed on the web browser, that have a function of hierarchically displaying and creating folders.

FIG. 7A shows the initial status of the web browser screen of the hot folder function. Screen components displayed on the web browser screen will be described with reference to the same figure. However, description of screen components typically provided by the web browser function itself, such as an address display field of the web browser screen and the title tabs of respective web pages, which are not related to the hot folder function according to the present embodiment, will be omitted.

A folder display area 901 is a hierarchy management function area which is managed by the file system server 604 included in the multifunctional peripheral 101 via the web browser screen of the web browser 705, and enables an operation such as movement or display of a hierarchy on the file system, and creation of a new folder. A print function selection button 902 is a button used when a print function is selected from among various functions provided by the hot folder function. A screen for default functions that is displayed immediately after passing through the authentication process shown in FIG. 6A and FIG. 6B is the screen shown in FIG. 7A.

A job list display button 903 is a button for transitioning to a screen for displaying a list of print jobs that have been inputted to the multifunctional peripheral 101 via the hot folder function. A current path display area 904 is an area for displaying a process target, that is, a current path in an absolute path format from a root folder in a case where the file system server 604 of the multifunctional peripheral 101 is accessed by the web browser 705. In FIG. 7A, that the current path is "/share" is illustrated. This is a state in which the state of the highest hierarchy of a public folder managed by the file system server 604 of the multifunctional peripheral 101 in the present embodiment is displayed on the web browser screen. It is not possible to move to a higher hierarchy than "/share" which is the highest hierarchy of publically available folders, and the file system server 604 of the multifunctional peripheral 101 in this embodiment does not allow a user to create a folder just below the folder of the highest hierarchy. FIG. 7A shows an example of a screen that satisfies this behavior.

A folder button 905, which is a destination folder designation button, is a button corresponding to a folder under the present folder. A number of destination folder designation buttons corresponding to the number of folders in the hierarchy of the current folder are displayed, each button has the name of the respective folder, and when selected, a folder screen request process is performed, and there is a transition to the screen of the folder indicated by the name. That is, the folder button 905 is a button for transitioning to a screen for "/share/folder". The folder screen request process will be described with reference to FIG. 13A to FIG. 14.

A logged-in user display area 906 is an area for displaying the user name inputted at the time of authentication using the web browser screen shown in FIG. 6A and FIG. 6B. A user-specific function selection button 907 is a button for instructing a transition to various functions providing screens customized for each login user.

A folder type display area 908 is a characteristic screen area in the present invention, and is an area for providing information to enable a determination as to whether or not a folder on the file system server 604 indicated by the path displayed in the current path display area 904 is a hot folder. In the example of the screen illustrated in FIG. 7A, it is illustrated that the folder on the file system server 604 corresponding to the current path "/share" is not a hot folder. In this state, even if an operation for performing a file transmission process to be described later is performed, transmission of a file is not performed.

Figure 7B:
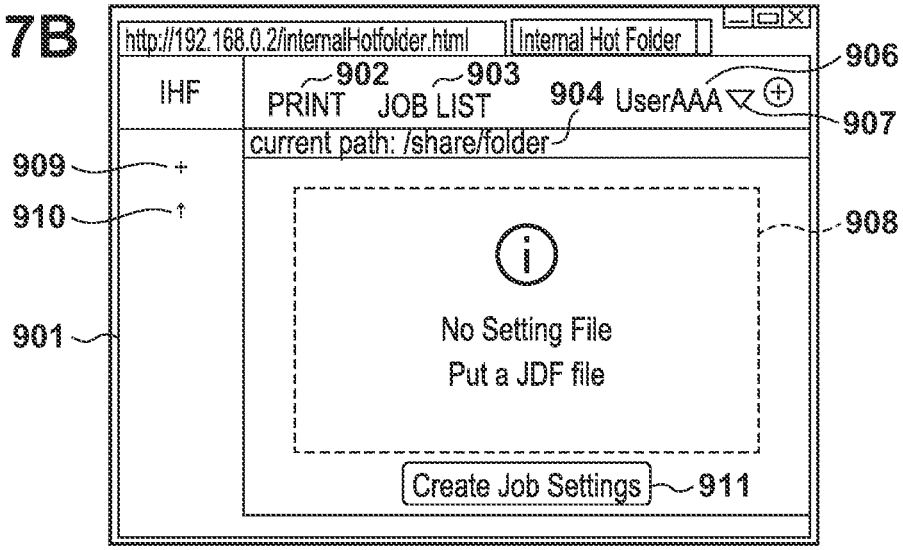

FIG. 7B shows an example of a screen state that is transitioned to immediately after the folder button 905 which is a destination folder designation button is selected in the screen state shown in FIG. 7A. This is a screen in which there is a transition from "/share" shown in FIG. 7A to "folder" which is immediately below, and "/share/folder" is displayed in the current path display area 904. The file system server 604 of the multifunctional peripheral 101 in the present embodiment is configured so that the user can create any folder or file in a folder lower than the uppermost folder. Therefore, unlike FIG. 7A which shows the highest hierarchy, a folder generation button 909 and an upper hierarchical movement button 910 are displayed.

The folder generation button 909 is a button for creating a new folder in the present folder. The upper hierarchical movement button 910 is a button for transitioning from the current folder to a higher folder. When the upper hierarchical movement button 910 is selected, a folder screen request process for the folder of one level higher is performed. A print setting generation button 911 is a button for transitioning to a screen for arranging a print setting file in the present folder. The print setting creation screen which is the destination of this transition will be described with reference to FIG. 8A to FIG. 8F.

Figure 7C:
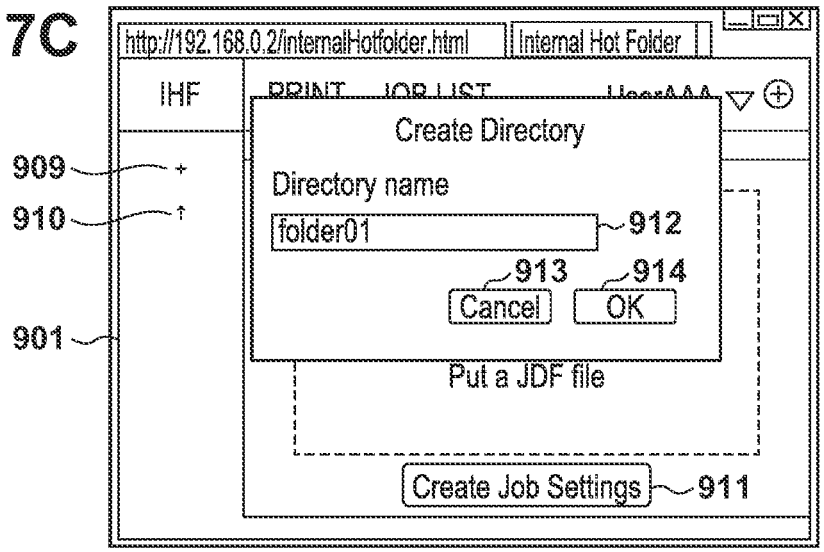

FIG. 7C shows an example of a state of a screen of the web browser that is displayed immediately after the folder generation button 909 is selected in FIG. 7B. A folder name input field 912 is an input field for inputting a name of a folder to be created. When an OK button 914 is pressed in a state where a text string of a desired folder name has been inputted, a folder having the same name as that described above is created immediately below the current path. When a cancel button 913 is pressed, the folder creation process is not executed, and the screen state returns to that of FIG. 7B which is the source of the transition. The OK button 914 can be selected when text has been input in the folder name input field 912. If the inputted folder name is the same as the name of an already existing folder, no folder is created.

Figure 7D:
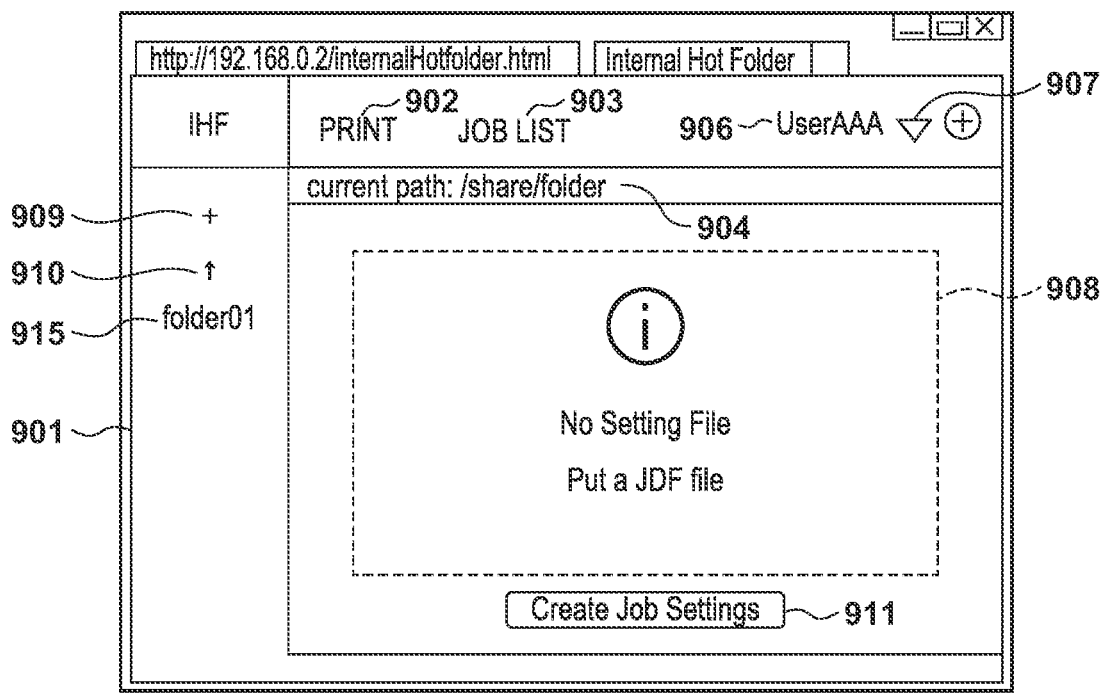

FIG. 7D shows an example of a state of a screen of the web browser that is displayed immediately after the OK button 914 is selected in FIG. 7C. As shown graphically, it can be confirmed by the addition of a folder01 button 915 to the folder display area that a folder named "folder01", which is the name of the folder created and indicated on the screen of FIG. 7C, has been newly created.

Figure 7E:
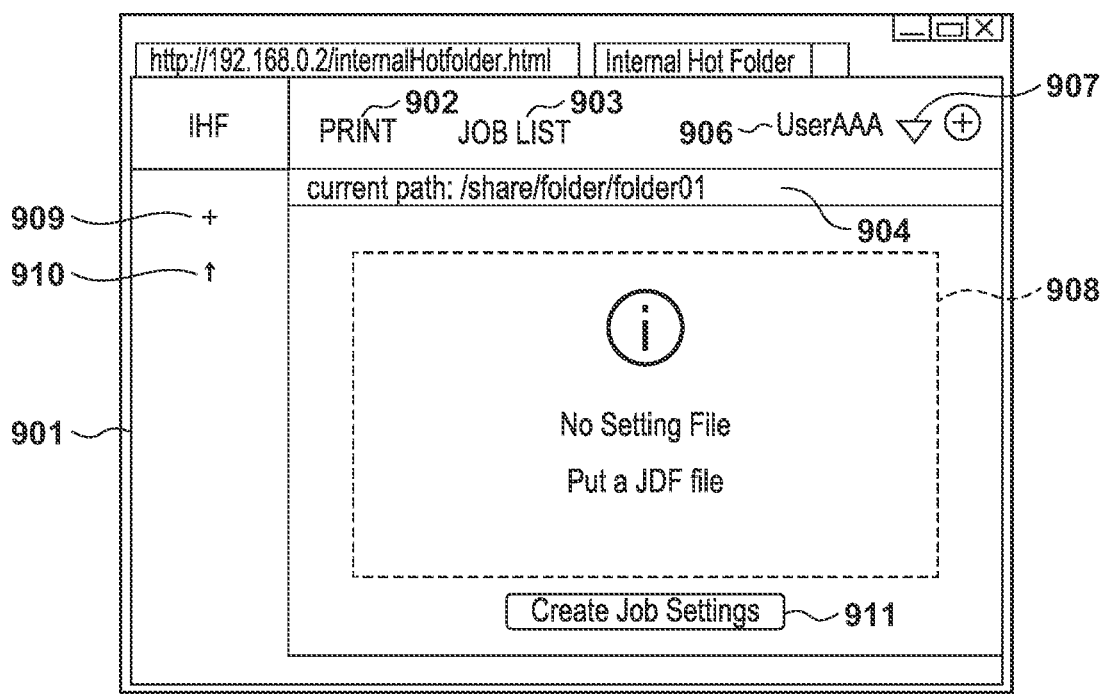

FIG. 7E shows an example of a state of a screen of the web browser that is displayed immediately after the folder01 button 915 is selected, when the screen displayed on the web browser is in the state shown in FIG. 7D. As shown in the figure, the current path display area 904 is "/share/folder/folder01". That is, it is confirmed that the current path has moved to the folder created by operating the screen components related to folder creation that were presented on the screens of FIG. 7C and FIG. 7D.

<Description of Web Browser Screen for Creating Print Settings>

Next, referring to FIG. 8A to FIG. 8F, a web browser screen for print setting creation according to the present embodiment will be described. Each of FIG. 8A to FIG. 8C is a print setting creation screen that is transitioned to by selecting the print setting generation button 911 in FIG. 7E. Function selection buttons, select boxes, and the like for selecting print settings that can be designated as the hot folder function of the multifunctional peripheral 101 are arranged. Each of FIG. 8A to FIG. 8C displays a part of the screen in a scroll-displayed state because the display area of the web browser screen is limited. However, the present invention is not limited to this screen configuration, and it may be displayed as a single screen by, for example, changing the displayed window size or changing the displayed text size. Because these are typical screen controls in a web browser, detailed description thereof will be omitted.

The print settings that can be set on the print setting creation screen include designating a print setting, designating a number of copies and what paper is to be used, designating an output destination for the paper, designating a resolution, designating color or monochrome, making a designation relating to image processing at the time of printing such as a profile, and designating post-processing for printed sheets such as staples and punch folds.

FIG. 8D shows an example where a folder for which print settings have been created on the print setting creation screens of FIG. 8A to FIG. 8C is displayed. In the folder type display area 908, information indicating that the folder is a "hot folder" in which the print function can be used is presented. In this state, a file transmission process can be performed by dragging and dropping a file held in one of the PCs 102 and 103 and the mobile terminal 104 to the folder type display area 908.

As described above, the current path "/share/folder/folder01" has been changed to a hot folder, and new function selection buttons (1002, 1003) are arranged on the screen of the web browser. A print setting confirmation button 1002 is for confirming print settings created for the folder. A temporary setting button 1003 is for making an instruction to transition to a function selection screen provided for the purpose of temporarily changing a print setting created for the folder and applying the settings in order to improve convenience when executing a print job.

FIG. 8E shows an example of an error-information presentation screen. This screen is a screen for notifying an error that can occur when a folder movement operation is performed with respect the hot folder function program 606 via the web server 605 using functionality of the Web browser and folder movement provided by the web browser screen. Error information indicating that the designated folder does not exist, and information indicating that a normal folder operation as described above cannot be performed because of the error, are presented in the folder type display area 908. The above-described error state is a case in which, when a first user is browsing a folder of a certain hierarchy on the web browser screen, another user deletes the same folder or changes the folder name, and the first user accesses the folder in this state. In this case, since the folder of the designated name does not already exist, it is possible to present screen information indicating an error as shown in the figure and notify the user accordingly. A similar error state also occurs when a user directly designates an address on a screen to display a file path that does not exist in the browser.

FIG. 8F is an example of print setting creation request data transmitted to the web server 605 when the print setting generation button 911 is selected. In the present embodiment, description is given for a case where print setting information is written in an XML format, but the print setting information may be in any format as long as the content of the print setting items set in FIG. 8A to FIG. 8C can be stored. When print settings are designated by the series of print setting creation screens shown in FIG. 8A to FIG. 8C, and a generation button 1001 is selected, the designated print settings are converted into XML-format data shown in FIG. 8F by JavaScript (registered trademark) code or the like.

XML data 1005 comprises a plurality of parts, including an XML declaration portion 1006, a metadata portion 1007, a general print setting portion 1008, and a layout setting portion 1009, respectively. The XML declaration portion 1006 is a statement that must always be written to indicate that the data format is XML. The metadata portion 1007 is for stating information on a target folder, and in the illustrated example, address information or path information of a folder to which print settings are applied is written in a folder path portion 1004. The general print setting portion 1008 states, for example, information on sheets used in printing, a number of copies, and a discharge method. The layout setting portion 1009 states a printing surface or an order of printing surfaces, a number of surfaces, and the like. The content of the general print setting portion 1008 is increased or decreased in accordance with designated print settings. For example, when a stapling setting or a folding setting is designated, information corresponding to a stapling setting portion and a folding setting portion is added. The generated XML data 1005 is transmitted to the web server 605 by asynchronous communication by the aforementioned web browser program. The web server 605 transmits the received XML data to the hot folder function program 606, and the hot folder function program 606 analyzes the data and creates a JDF file for realizing the print designation included in the XML data.

<File System Configuration of Multifunctional Peripheral>

Figure 9A:
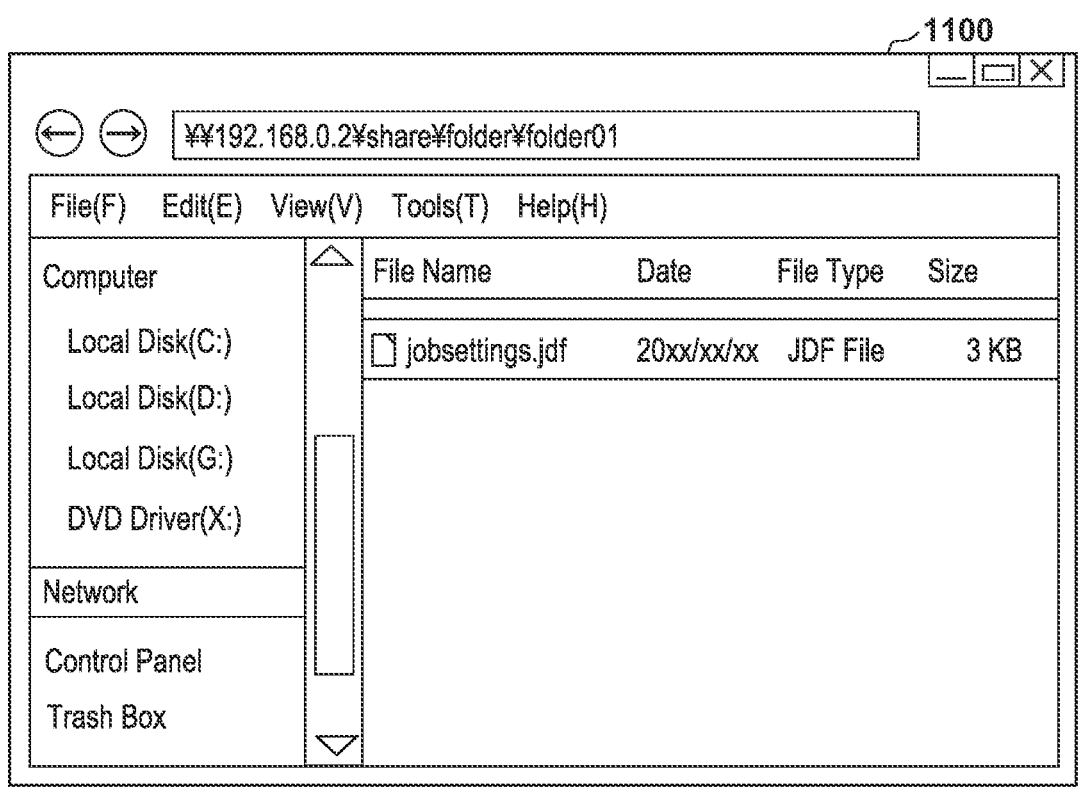
Figure 9C:
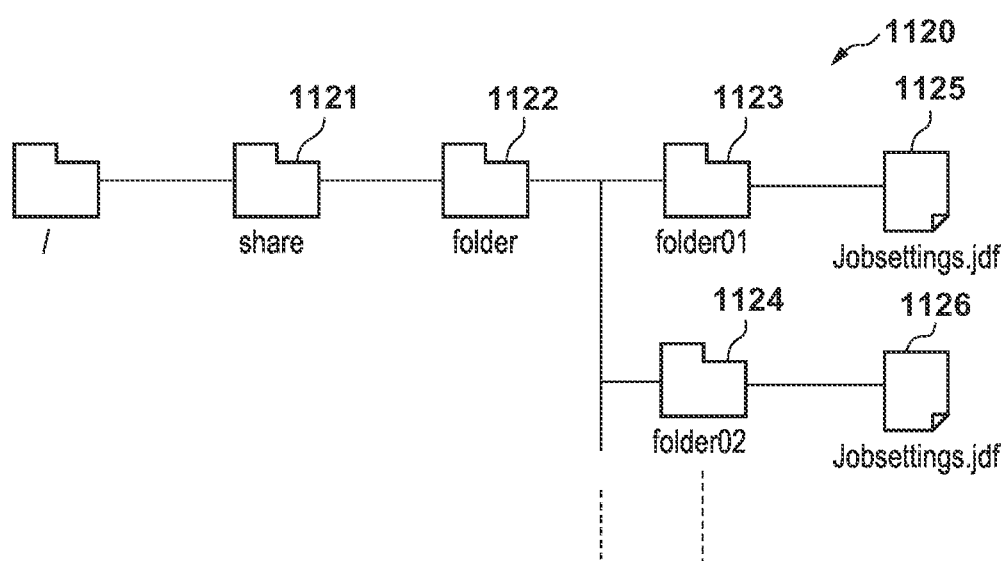

Next, referring to FIG. 9A to FIG. 9C, the configuration of the file system of the multifunctional peripheral 101 according to the present embodiment will be described. FIG. 9A is a client file system screen 1100 in which a folder configuration created on the HDD 404 of the multifunctional peripheral 101 is displayed on the CRT 510 of the client apparatus 102 via the file system server 604. In the folders where a print setting file is created from the print setting creation screen of FIG. 8A to FIG. 8F, it is possible to confirm that a JDF file is created as the print setting file.

FIG. 9B is an example of a JDF file. FIG. 9C is a schematic diagram showing a folder configuration in the HDD 404 of the multifunctional peripheral 101. This has a state where folder01 (reference numeral 1123) and folder02 (reference numeral 1124) have been created by the operation of FIG. 7A to FIG. 7E, and respective print setting files 1125 and 1126 have been created by the operation of FIG. 8A to FIG. 8F. A share folder 1121 is a folder of the highest hierarchy, and a folder 1122 is at a hierarchy one below.

<Description of Web Browser Screen for Temporary Setting>

Figure 10A:
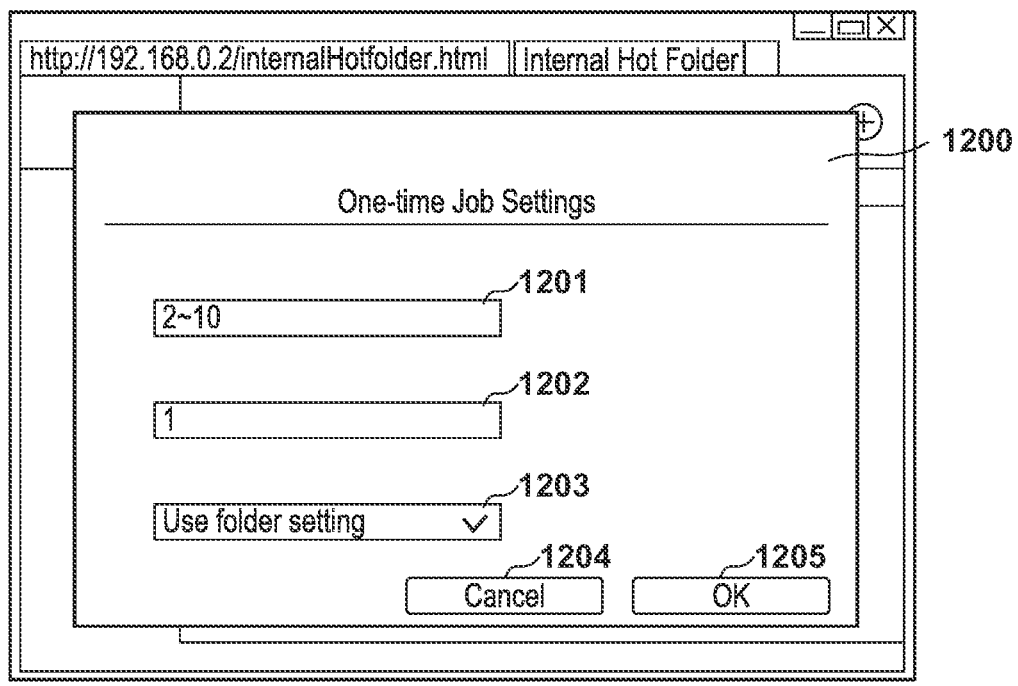

Next, referring to FIG. 10A to FIG. 10D, a web browser screen for a temporary setting according to the present embodiment will be described. FIG. 10A is a temporary setting screen 1200 that is displayed after being selected on the folder display screen, and is used when inputting a print job by changing some print settings set in a folder. A print setting designated on the temporary setting screen 1200 is valid in a duration until the page is updated or a transition is made, and is applied in preference to a value of a setting item that is the same as that of the print setting file arranged in the folder created by FIG. 8A to FIG. 8F. However, a temporary print setting is something that is used temporarily, and does not update the print setting file itself. On the temporary setting screen 1200, there are items that enable a print page range, a number of copies, and a sheet size, for example, to be designated by temporary settings, but the present invention is not limited to these. If each designation item of the temporary setting screen 1200 is already set, set values are changeably displayed in respective setting portions 1201 to 1203, as an initial state where the temporary setting screen 1200 is displayed.

A print page range designation portion 1201 is a setting portion for designating pages to print from the print file. With the print page range, pages to print may be designated by arranging pages individually and separated by ",", a range may be designated by designating a first page and a last page by "-", or a combination of these may be used. What can be inputted is numbers and symbols as described above, and it is not possible to input text other than numbers. Description is given later regarding operation when there is incorrect input, and operation when input is not made. When a page not present in a print file is designated, designation of that page is ignored. For example, when a print file has 5 pages, if the 1st page and the 10th page are designated, only the 1st page is printed, and the 10th page is ignored because there is no print data. If all of the designated pages do not exist, there is an error and printing is not performed.

The number of copies designation portion 1202 is a setting portion for designating a number of copies to print. It is possible to designate a number from 1 to 9999 for the number of copies, and it is not possible to input text other than this. Description is given later regarding operation when there is incorrect input, and operation when input is not made. The sheet size designation portion 1203 is a setting portion for setting a size of a sheet to use for printing. It is a pull-down menu, and enables a selection from a plurality of sheet sizes that can be used by the device. For the top of the pull-down menu, in other words an initial state for when a selection is not being performed, using a sheet size designated by the print setting file arranged in the folder is designated.

A cancel button 1204 is a button for ending the temporary setting screen 1200. When the cancel button 1204 is selected, display of the temporary setting screen 1200 ends without enabling setting entered by the temporary setting screen 1200, and the folder display screen of FIG. 8D is returned to.

If the OK button 1205 is selected, a temporary setting input check program that was transmitted from the multifunctional peripheral 101 together with the Web page operates to determine whether input content is correct. If there is a setting item for which input content is incorrect, the corresponding input or setting item name is displayed by red text (an emphasized display), and the temporary setting screen 1200 remains. If there is no incorrect input in input content, the designations are stored as valid values, the temporary setting screen 1200 is closed, and a folder display screen 1210 in which a superimposed display of the designated temporary settings is performed on the folder display screen is displayed (FIG. 10B).

A temporary setting display 1211 is a display area in which the setting content of valid temporary settings inputted by the temporary setting screen 1200 is displayed. In this example, illustration is given for the temporary setting display 1211 for a case in which, for temporary settings, 2-10 was inputted in the print page range designation portion 1201, and 1 was designated in the number of copies designation portion 1202. When a file is dragged and dropped the folder type display area 908 in this state, printing will be executed using the print page range and the number of copies designated by temporary settings without using designations of the number of copies and the print page range of the print setting file. The temporary settings are valid in a case where a print request operation is performed in the state where the temporary setting display 1211 is being displayed. A validity period for the temporary settings may be until a print request operation is made, until the Web page is updated, or a transition is made. In any case, the print setting file itself does not change, and values of the temporary settings are not stored in the multifunctional peripheral 101.

Figure 10B:
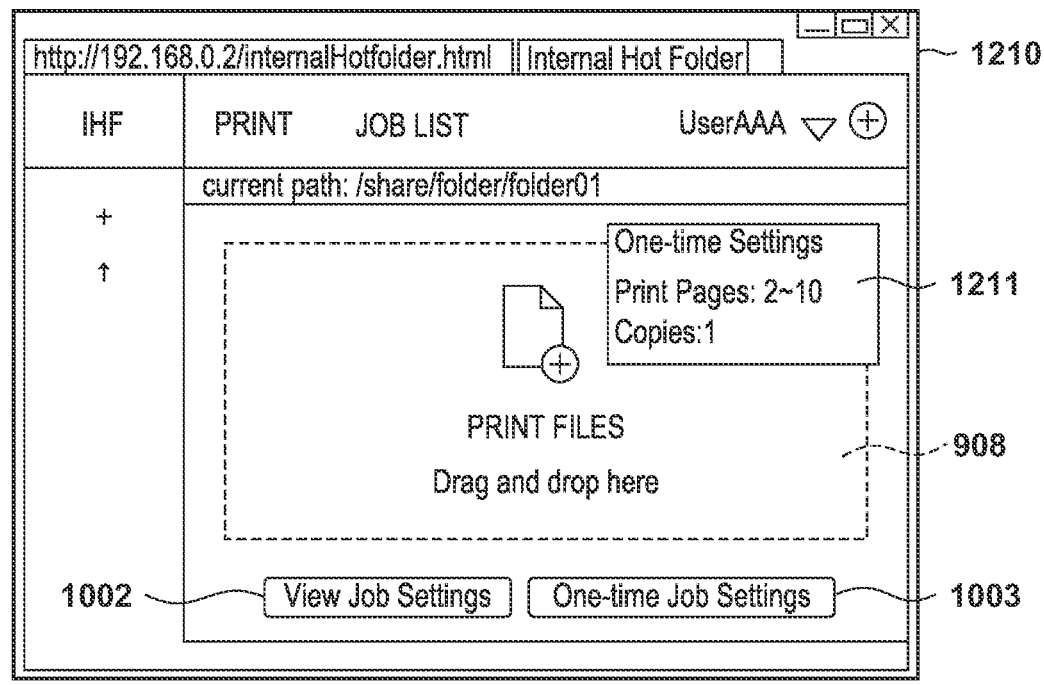

If a print instruction is executed in the state of FIG. 10B, settings designated by temporary settings are applied in preference to settings designated in the print setting file. For a setting item for which there is no input, a designation of a setting corresponding to the print setting file becomes valid. A setting designated by a temporary setting is stored by the Web browser 705, and transmitted to the multifunctional peripheral 101 when a print request or a request for a print setting confirmation screen is accepted. A setting that is not designated is not transmitted.

Figure 15:
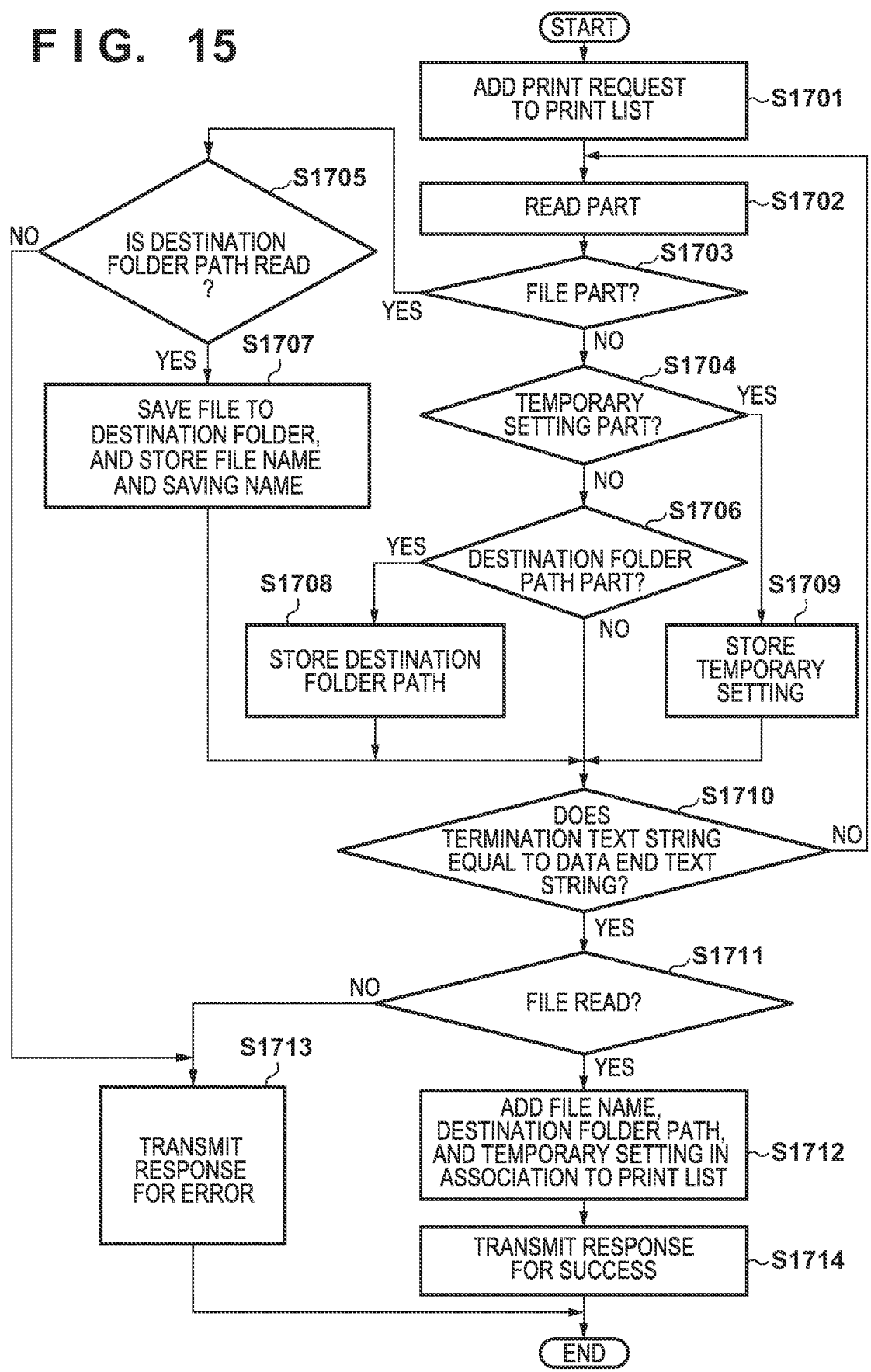
FIG. 15 is a flow chart showing a sequence of processing by a CPU when a print request is accepted.

FIG. 10C illustrates a schematic diagram of data transmitted from the client apparatus 102 to the multifunctional peripheral 101 when performing a print request by dragging and dropping a file onto the folder type display area 908 of the folder display screen 1210. FIG. 15 will be used to give a detailed description later regarding a sequence of processing of the CPU 401 of the multifunctional peripheral 101 when a print request is accepted.

An HTTP header portion 1221 is a portion needed when requesting an HTTP connection, and describes a type of the connection, connection destination information, a type of data to transmit, and the like. In this example, it is assumed that a MIME format is used for data transmission, and a boundary text string for partitioning each part that configures MIME is written.

MIME parts are elements that configure MIME data, and there are a destination folder path part 1222, temporary setting parts 1223 and 1224, and a file part 1225. Temporary setting parts are a print page range designation part 1223 and a number of copies designation part 1224. Each part is configured from a MIME part header portion that extends until the first blank line of the part, and a data portion. Identification of a part is performed in accordance with "name" of "Content-Disposition". In the illustrated example, the "name" of "Content-Disposition" is distinguished by defining the values "folderpath" for the destination folder path part, "pages" for the print page range designation part, "copies" for the number of copies designation part, and "file" for the file part.

A MIME termination text string 1226 is a special text string for declaring the termination of MIME data. It is something resulting from adding "--" to the boundary text string.

Position of MIME parts in the data are fixed in a predefined order. In particular, as described later by FIG. 15, the destination folder path part must always be defined before the file part. As described above, only an item in which a temporary setting is designated is included in a temporary setting part. Parts for items not designated are not included in the MIME.

If a request for a print setting confirmation screen is accepted, XML that includes a designation of temporary settings in addition to a folder path which is a target of input is transmitted. FIG. 10D illustrates an example of print setting confirmation screen request XML 1230 that is transmitted from the client apparatus 102 to the multifunctional peripheral 101 when the print setting confirmation button 1002 of the folder display screen 1210 in which a temporary setting is valid is selected.

Figure 16:
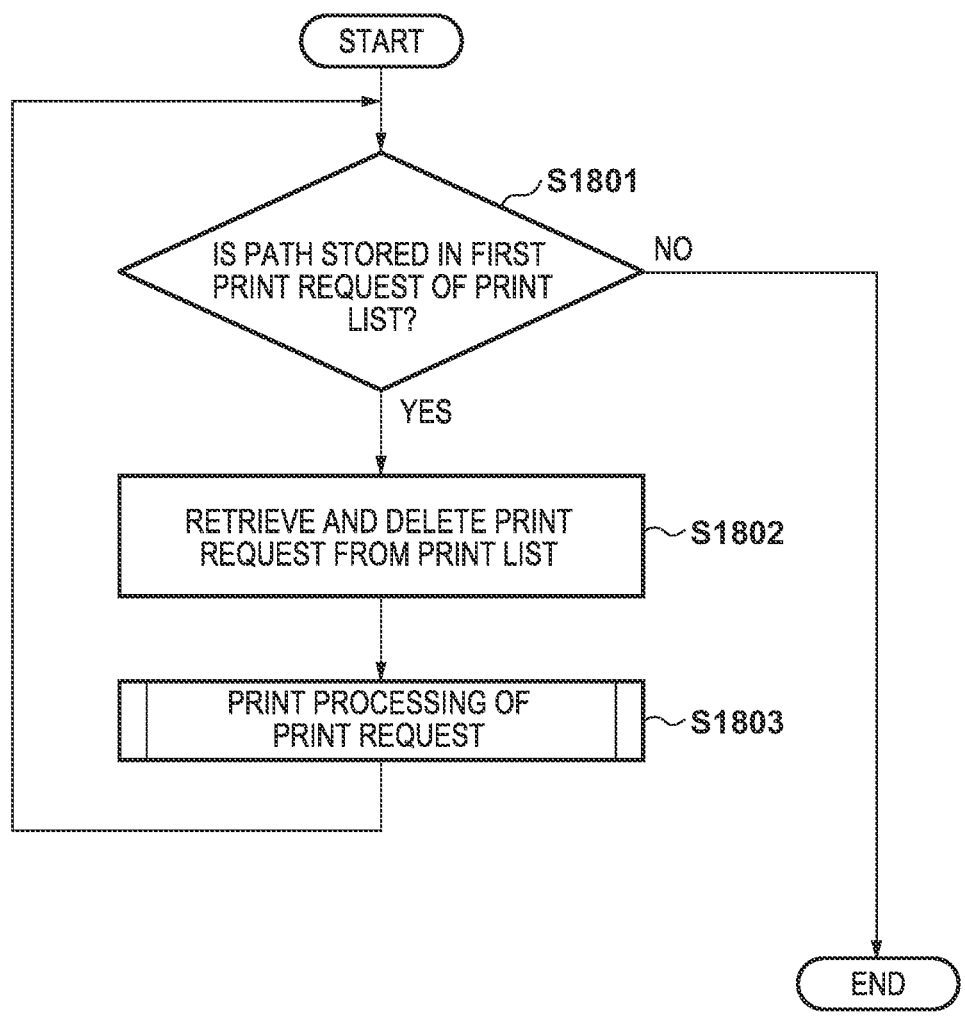
FIG. 16 is a flow chart showing a sequence of processing by the CPU for controlling a print order of accepted files.

The print setting confirmation screen request XML 1230 comprises a folder path element 1231 for storing a path of a target folder for which to perform a print setting confirmation, and temporary setting elements 1232 and 1233 for storing values of items designated by respective temporary settings. The illustrated example illustrates an example of a case where a print range setting and a number of copies setting are designated by temporary settings, and the temporary setting elements comprise a print range setting 1232 and a number of copies setting element 1233. An item not designated by a temporary setting is not included in a temporary setting element. FIG. 11B and FIG. 11C are used to give a description later regarding a setting confirmation screen displayed at this point. The flow chart of FIG. 16 is used to give a description later for a sequence of processing of the CPU 401 upon receiving the print setting confirmation screen request XML 1230.

<Description of Web Browser Screen for Setting Confirmation>

Next, referring to FIG. 11A to FIG. 11C, an example of a screen displayed by the Web browser 705 when the print setting confirmation button 1002 is selected on FIG. 8D or FIG. 10B will be described.

Figure 11A:
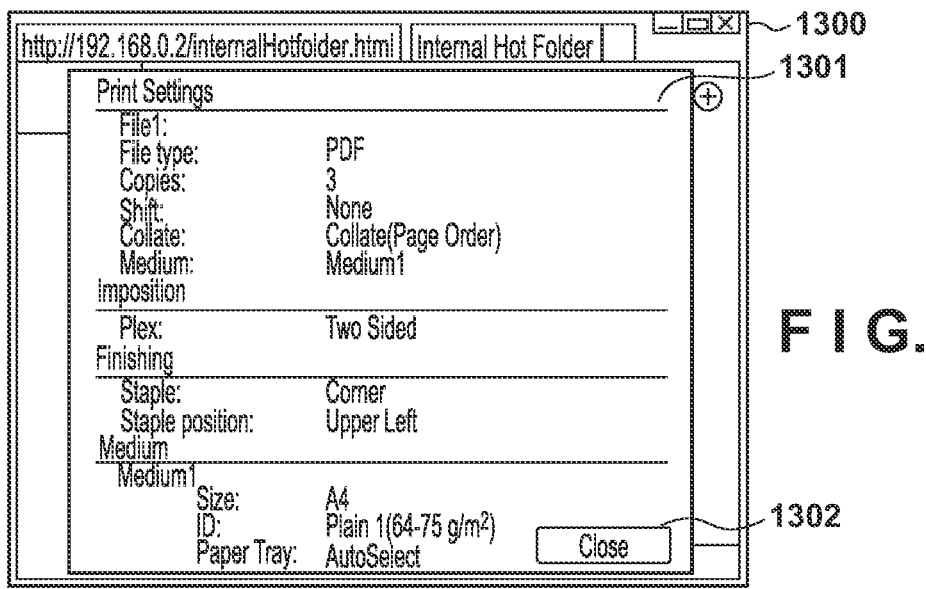
FIG. 11A to FIG. 11C are views illustrating examples of a print setting confirmation screen displayed on the Web browser.
Figure 11B:
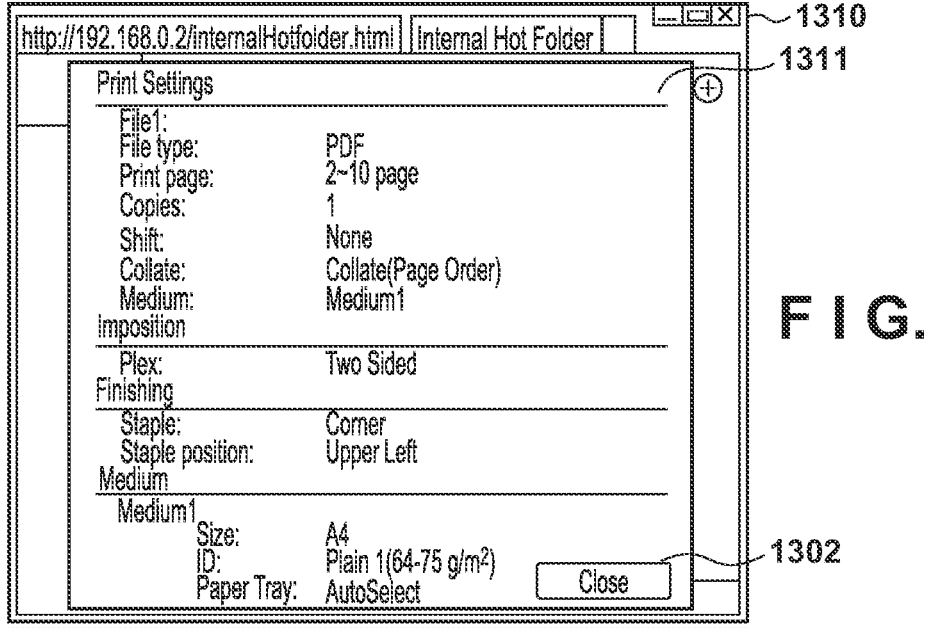
Figure 11C:
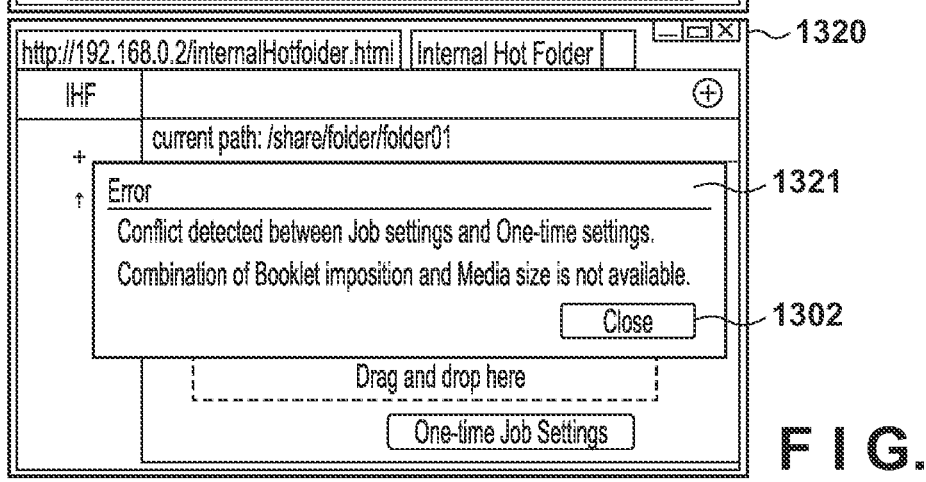

FIG. 11A illustrates a confirmation screen 1300 for a case where the print setting confirmation button 1002 of FIG. 8D is selected in a state where no temporary setting has been made. A print setting display area 1301 is a display to enable a user to understand a result of analyzing content of the print setting file created in the folder by the print setting creation operation described by FIG. 8A to FIG. 8F. Content displayed differs in accordance with print setting content that has been created. Out of the many print setting items that are being displayed, it is seen that, in the print setting file, the number of copies is designated as 3, and a print range is not designated. A close button 1302 is a button for ending the confirmation screen 1300. When the close button 1302 is selected the print setting display area 1301 ends, and the folder display screen of FIG. 8D is returned to.

FIG. 11B illustrates a confirmation screen 1310 for confirming valid print settings for a temporary setting for a case where the print setting confirmation button 1002 is selected on the folder display screen 1210, where temporary settings are valid, of FIG. 10B in a state for after temporary settings have been made. A display area 1311 for displaying print settings where temporary settings are valid is something in which, from out of the print setting display area 1301 of FIG. 11A, values of print setting items designated by temporary settings have been replaced. Because the number of copies was designated as 1 and the print range was designated as pages 2-10 by the temporary settings, the number of copies has become 1, and an item for the print range which was not displayed on the confirmation screen 1300 is added and its designation has become pages 2-10. Items replaced by temporary settings may be made easier for a user to identify by having a display in which it is possible to distinguish them from other items such as by changing a text color or making the font bold. The close button 1302 has the same function as that described by FIG. 11A. When selected the display area 1311 ends, and the folder display screen of FIG. 8D is returned to.

FIG. 11C illustrates the print setting error screen 1320 that, in a case where a conflict (an inconsistency) has occurred between a temporary setting and a setting of the print setting file when the print setting confirmation button 1002 is selected on the folder display screen 1210 of FIG. 10B in the state after a temporary setting is made, enables a factor of the conflict to be confirmed. A conflict error display area 1321 is a display area for indicating to a user a conflict that has occurred between a temporary setting and a print setting. In this example, a message indicating that a sheet size designated by the sheet size designation portion 1203 which is a temporary setting conflicts with a designation of a bookbinding layout which is a print setting is displayed. By confirming the display, a user can know of the error in advance, without performing a print request operation, and can correct the settings. The close button 1302 has the same function as that described by FIG. 11B. When selected, the conflict error display area 1321 ends, and there is a transition to FIG. 10B.

<Description of Web Browser Screen for when a Print Job is Inputted>

Next, referring to FIG. 12A to FIG. 12E, description is given for examples of screens that are transitioned to immediately after files are arranged by an operation such as dragging and dropping into the folder type display area 908 of FIG. 8D using an instructing apparatus such as a mouse. As stated in the description for FIG. 7E, the folder in which the current path is "/share/folder/folder01" is a hot folder, and is not simply a shared folder. This is a folder to which print settings have been linked by the series of operations shown in FIG. 8A to FIG. 8C. Therefore, when the above-described operation is performed with respect to this folder via a web browser, a processing request and processing to transmit the print target data from the web browser 705 to the web server 605 are executed. This processing is performed by the web browser 705 executing JavaScript, as stated in the description of the hot folder function program 606 in FIG. 4B.

Figure 12A:
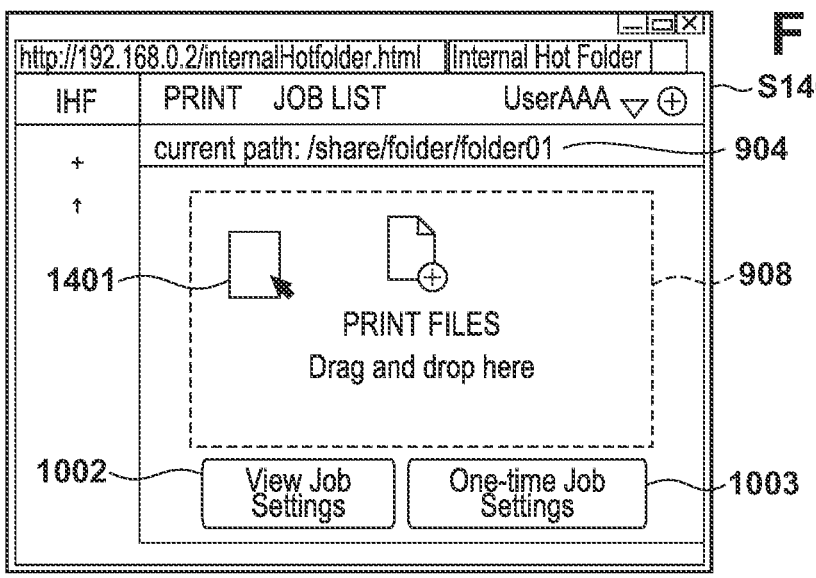
FIG. 12A to FIG. 12E are diagrams of the transition of web pages displayed on the web browser when a print instruction is made.

FIG. 12A shows a file transmission selection screen 1400 displayed by the web browser 705 when an operation of dragging and dropping a file to the folder type display area 908 is performed using an instructing apparatus such as a mouse. A drag-and-drop display 1401 indicates that a drag-and-drop operation is in progress. This display is provided by the system of the client apparatus and is not necessarily as shown in the figure. No matter how display is performed, there is no impact on the practice of the present invention.

Figure 12B:
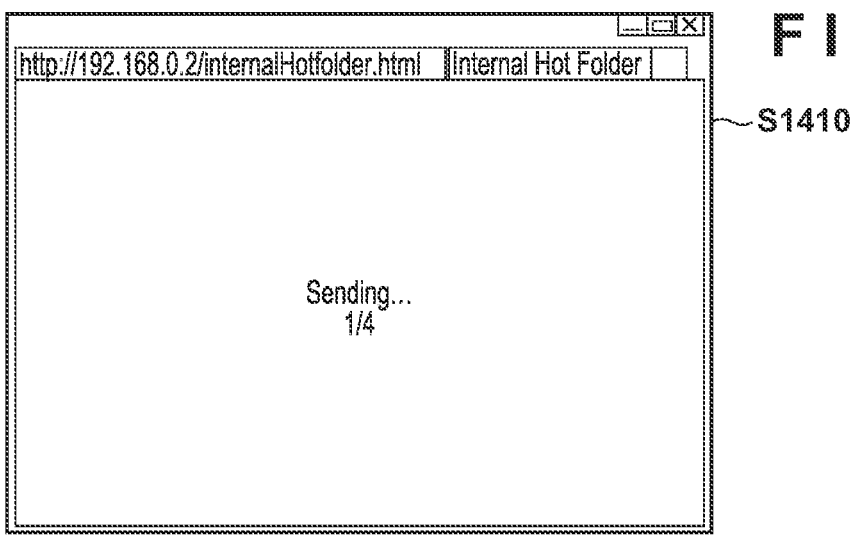

FIG. 12B shows an example of a file transmission underway screen 1410 displayed by the web browser 705 during transmission of a file. As shown in the figure, information that enables the file transmission being underway to be determined is presented. When a plurality of files are transmitted at the same time, display to enable the number of files being transmitted to be identified is performed. For example, each time a file being transmitted changes, the display is changed.

Figure 12C:
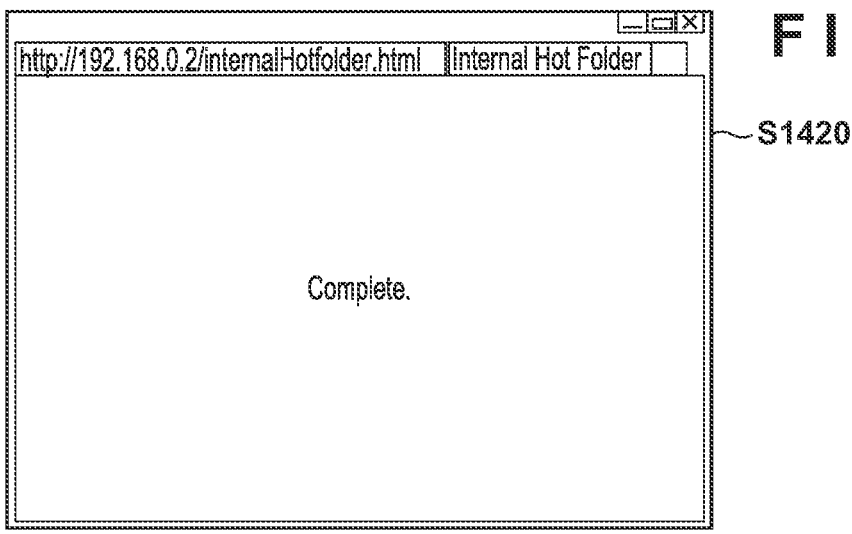
Figure 12D:
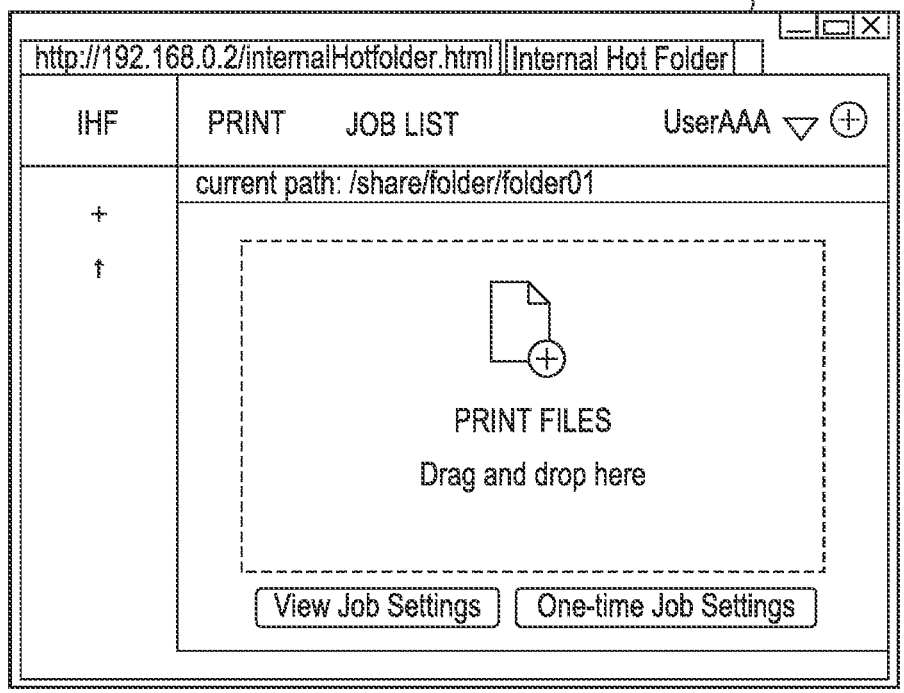

FIG. 12C illustrates a transmission complete screen 1420 displayed immediately after the Web browser 705 completes processing to transmit the selected file in FIG. 12B. As shown in the figure, information that enables completion of the file transmission process to be determined is presented. FIG. 12D shows an example of a folder display screen 1430 transitioned to after a predetermined amount of time has elapsed after the screen displayed by the web browser 705 entered the state shown in FIG. 12C. The screen state shown in the figure is the same as that shown in FIG. 7E. That is, information indicating that the instruction of print processing with respect to the current path "/share/folder/folder01" can be accepted again is presented.

Figure 12E:
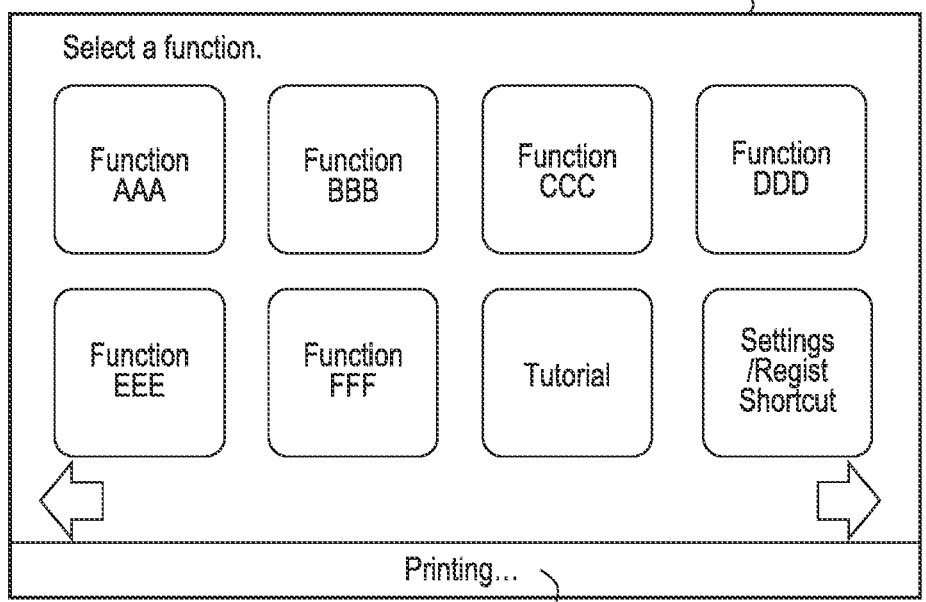

FIG. 12E illustrates a printing underway screen 1440 displayed on the operation device 413 of the multifunctional peripheral 101 when a transmitted file is being printed. The print order of the transmitted files will be described later with reference to the chart of FIG. 15 and the schematic diagrams of the print lists of FIG. 19A to FIG. 19E. A device status display 1402 is an area for displaying the present state of the multifunctional peripheral 101. In FIG. 12E, "Printing" is displayed because the multifunctional peripheral 101 is executing print processing. When there is no state to be displayed, nothing is displayed, and when an error such as a jam or consumable exhaustion occurs, the details (factor) of the error that has occurred are displayed.

<Processing Sequence when Accepting Operation on Web Browser>

Figure 13A:
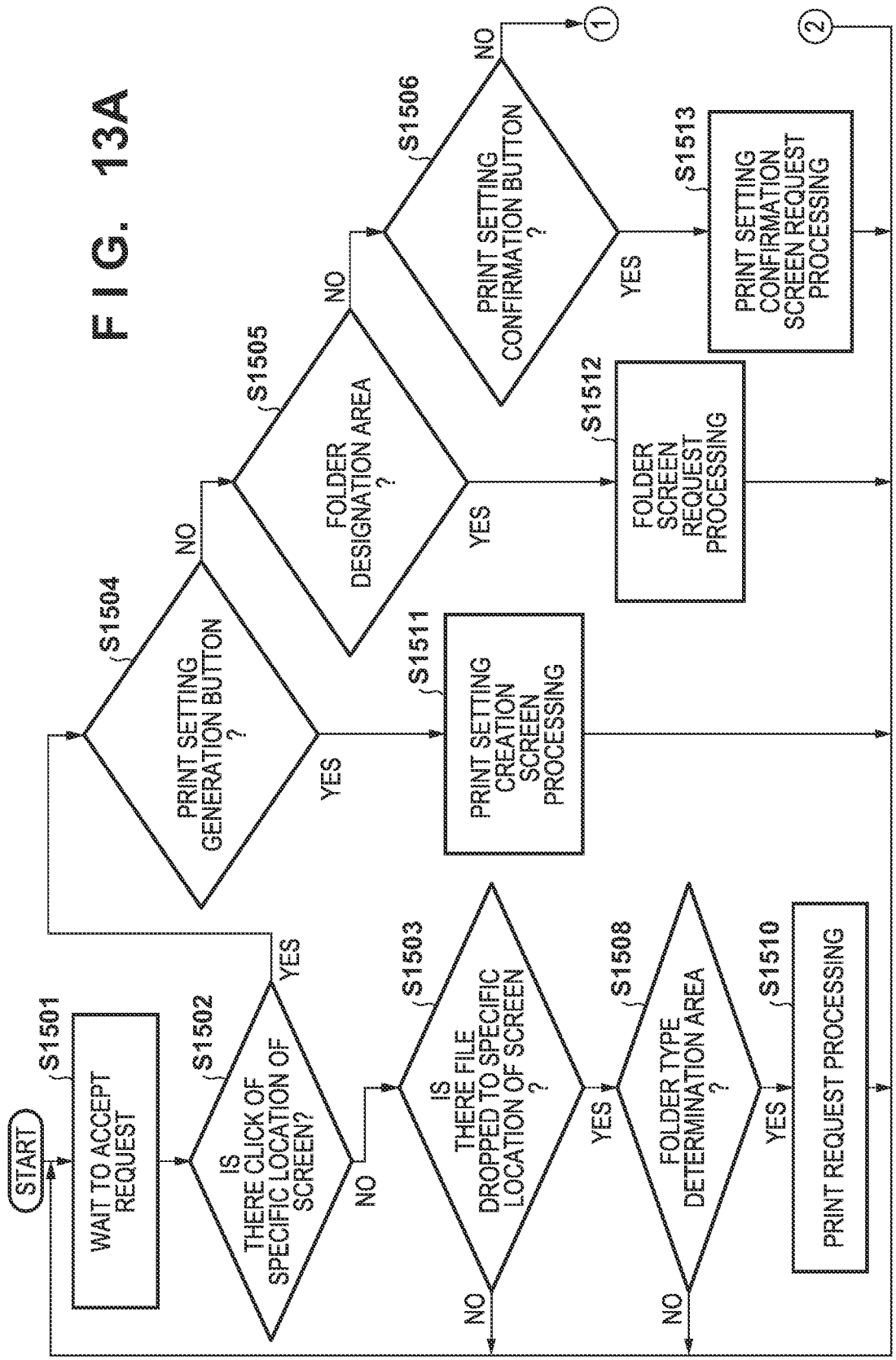

Next, referring to FIGS. 13A and 13B, a sequence of processing by the CPU 501 when executing the functions described in FIG. 7A to FIG. 12E will be described. The processing described below may be realized by, for example, the CPU 501 of the client apparatus reading out a control program stored in the ROM 503 or the HDD 511 to the RAM 502 and executing the control program. Here, the processing is started from the point where a folder display screen is displayed on the web browser 705 in accordance with the operation described with reference to FIG. 6A, FIG. 6B, and FIG. 7A to FIG. 7E.

In step S1501, the CPU 501 accepts an operation (user input) from a user with respect to the web browser 705. If it is determined that an operation has been accepted, the processing proceeds to step S1502, otherwise, the processing remains in step S1501. In step S1502, the CPU 501 determines whether or not the operation accepted in step S1501 is an operation of clicking the client apparatus screen. In a case of an operation where the screen is clicked, the processing proceeds to step S1504; otherwise, the processing proceeds to step S1503. The operation of clicking the screen here corresponds to a click operation by a pointing device such as mouse in the case of the PCs 102 and 103, and corresponds to a touch operation of a touch panel device in the case of the mobile terminal 104. With respect to a click operation, when a press is released within a predetermined time after the start of the press, it is determined that this operation has been performed.

In step S1503, the CPU 501 determines whether or not the operation accepted in step S1501 is an operation of dragging and dropping a file onto the screen. In the case of an operation for dragging and dropping, the processing proceeds to step S1508; otherwise, the processing returns to step S1501. With respect to a drag-and-drop operation, for example, it is determined that the operation is performed in a case of after the detection of a press of a mouse button, and, after a predetermined amount of time has elapsed and movement of a predetermined distance, the release of the press is detected. In step S1508, the CPU 501 determines whether or not the operation in step S1501 of dragging and dropping a file is an operation with respect to the folder type display area 908. If so, the processing proceeds to step S1510; otherwise, the processing returns to step S1501. In step S1510, the CPU 501 executes communication processing for transmitting the file to the Web server 605. When a transmission process for the print target data ends, the processing returns to step S1501.

Meanwhile, in step S1504, the CPU 501 determines whether or not the operation of clicking the screen accepted in step S1501 is an operation with respect to the print setting generation button 911. With respect to a click operation, for example, when the release of a press is detected within a predetermined time after the button of the mouse is pressed, it is determined that this operation is performed. In the case of an operation where the print setting generation button 911 is clicked, the processing proceeds to step S1511; otherwise, the processing proceeds to step S1505. In step S1511, the CPU 501 performs processing for a print setting creation screen for accepting input by displaying a job setting creation screen on the Web browser 705. Processing for the print setting creation screen is described by FIG. 8A to FIG. 8F. When this processing ends, the processing returns to step S1501.

In step S1505, the CPU 501 determines whether the operation of clicking the screen accepted in step S1501 is an operation on a button for moving a folder, that is, an operation on the upper hierarchical movement button 910 or the destination folder designation buttons 905 or 915. In a case of an operation where the destination folder designation button is clicked, the processing proceeds to step S1512, otherwise, the processing proceeds to step S1506. In step S1512, the CPU 501 performs folder screen request processing for acquiring a folder screen from the multifunctional peripheral 101 and displaying an acquired Web page. The folder screen request processing uses a GET request, for example, which is a standard function of a Web browser, to transmit a path of the folder to acquire, and display an acquired folder screen on the Web browser 705. Upon display, the processing returns to step S1501.

In step S1506, the CPU 501 determines whether or not the operation of clicking the screen accepted in step S1501 is an operation with respect to the print setting confirmation button 1002. In the case of an operation where the print setting confirmation button 1002 is clicked, the processing proceeds to step S1513; otherwise, the processing proceeds to step S1507. In step S1513, the CPU 501 performs print setting confirmation screen request processing for acquiring a print setting confirmation screen from the multifunctional peripheral 101 and displaying an acquired Web page. The print setting confirmation screen request processing uses a POST request, for example, which is a standard function of a Web browser to transmit the print setting confirmation screen request XML 1230 described by FIG. 10D, and display an acquired confirmation screen on the Web browser 705.

In step S1506, the CPU 501 determines whether or not the operation of clicking the screen accepted in step S1501 is an operation with respect to the temporary setting button 1003. In the case of an operation that clicks the temporary setting button 1003, the processing proceeds to step S1509; otherwise, the processing returns to step S1501. In step S1509, the CPU 501 displays the temporary setting screen 1200 on the Web browser 705 and accepts input. Upon displaying, the processing proceeds to step S1514. In step S1514, the CPU 501 waits for input from a user. The processing remains at step S1514 until input is accepted. Upon accepting input, the processing proceeds to step S1515.

In step S1515, the CPU 501 determines whether or not the operation accepted in step S1514 is an operation of clicking the OK button 1205. In a case of an operation that clicks the OK button 1205, the processing proceeds to step S1517; otherwise, the processing proceeds to step S1516. In step S1516, the CPU 501 determines whether or not the operation accepted in step S1514 is an operation of clicking the cancel button 1204. In the case of an operation that clicks the cancel button 1204, the processing proceeds to step S1518; otherwise, the processing returns to step S1514. In step S1517, the CPU 501 stores in the RAM 502 a temporary setting accepted on the temporary setting screen, and the processing proceeds to step S1518. As mentioned previously, the stored temporary setting is valid only while the folder display screen 1210 is being displayed, and if an operation such as transitioning to another Web page or using an update function of the Web browser 705 is performed, the temporary setting stored to the RAM 502 is deleted. In step S1518, the CPU 501 ends the temporary setting screen, displays the folder display screen 1210, and returns the processing to step S1501.

<Processing Sequence for when Request to Display Folder Screen is Accepted>

Next, referring to FIG. 14, description is made for a sequence of processing by the CPU 401 of the multifunctional peripheral 101 when a request for displaying a folder screen is accepted. The processing described below may be realized by, for example, the CPU 401 of the multifunctional peripheral 101 reading out a control program stored in the ROM 403 or the HDD 404 to the RAM 402 and executing the control program. Processing is started when a request to display a folder screen is accepted from a client.

In step S1601, the CPU 401 functions as an accepting unit, and acquires a path of a folder to be displayed from the accepted folder screen display request. In the present embodiment, it is assumed that a folder screen display request is made by a GET request which the Web browser 705 is provided with as standard, and the path of the folder is designated by a GET parameter. When the path of the folder is acquired, the processing proceeds to step S1602.

In step S1602, the CPU 401 determines whether or not a folder exists at the folder path acquired in step S1601. If a folder exists, the processing proceeds to step S1603, and if a folder does not exist, the processing proceeds to step S1604. In step S1604, the CPU 401 creates the web page shown in FIG. 8E, which is a folder display screen indicating that the folder path is invalid, and the processing proceeds to step S1607.

In step S1603, the CPU 401 determines whether or not there is a print setting file in the folder indicated by the folder path acquired in step S1601. Whether or not there is a print setting file is determined by acquiring a list of files in the folder and determining whether or not there is a file having a predetermined file extension. If a print setting file is present, the processing proceeds to step S1605, otherwise the processing proceeds to step S1606. It is assumed that, if the folder itself is not present, there is no print setting file.

In step S1605, the CPU 401 creates the web page of FIG. 8D, which is a designated folder display screen with respect to which a print request is possible, and a program that operates on a Web browser, and the processing proceeds to step S1607. Here, it is assumed that some of print request processing, processing to request a print setting confirmation screen, and temporary setting screen display processing are performed by JavaScript. In contrast, in step S1606, the CPU 401 created a Web page of FIG. 7D which is a folder display screen in which a designated print request is invalid, and the processing proceeds to step S1607.

In step S1607, the CPU 401 transmits the Web page and program created in one of step S1604 to step S1606 as a response, and the processing ends.

<Process for Receiving Print Request>

Next, referring to FIG. 15, description is given for a sequence of processing of the CPU 401 process of the multifunctional peripheral 101 when a print request transmitted by the client apparatus 102, 103, and 104 is received in the above step S1508. The processing described below may be realized by, for example, the CPU 401 of the multifunctional peripheral 101 reading out a control program stored in the ROM 403 or the HDD 404 to the RAM 402 and executing the control program. When a print request from the client apparatus 102, 103, 104 is detected, the processing is started.

In step S1701, the CPU 401 adds the print request to the end of a print list stored in the RAM 402 and the processing proceeds to step S1702. The information to be added includes the path of a hot folder that is the input destination and is included in the received request, the name of who inputted the request, a file name, and the like. In step S1702, the CPU 401 starts reading one MIME part illustrated in FIG. 10C from the received print request, and the processing proceeds to step S1703. In step S1703, the CPU 401 determines whether or not the MIME part for which reading started is the file part 1225. Description regarding the file part 1225 was given using FIG. 10C. In a case of being for the file part 1225, the processing proceeds to step S1705; otherwise, the processing proceeds to step S1704.

In step S1705, the CPU 401 determines whether the destination folder path part 1222 was read. If read the processing proceeds to step S1707, and if not read the processing proceeds to step S1713. In step S1713, the CPU 401 transmits information indicating an error as a response to the print request, and the processing ends. In step S1707, the CPU 401 reads until the end of the file part 1225, and saves the read file to an input folder path stored in step S1708. For a name when saving, it is assumed that the text string designated by "name" of "Content-Disposition" is used, and when there is a file of the same name, so as to not overlap a name is created a text string created in accordance with a predetermined rule is added to the end of the name. A value designated by "filename" of "Content-Disposition" is stored as a file name, and a name for when saving the file is stored as a saving name. Upon storing, the processing proceeds to step S1710.

Meanwhile, in step S1704, the CPU 401 determines whether or not the MIME part for which reading started is one of the temporary setting parts 1223 and 1224 illustrated in FIG. 10C. In a case of being for a temporary setting part, the processing proceeds to step S1709; otherwise, the processing proceeds to step S1706. In step S1709, the CPU 401 reads until the end of the temporary setting part, stores the read temporary setting in association with an item name, and the processing proceeds to step S1710.

In step S1706, the CPU 401 determines whether or not the part for which reading started is the destination folder path part 1222 illustrated in FIG. 10C. In a case of being for the destination folder path part 1222, the processing proceeds to step S1708; otherwise, the processing proceeds to step S1710. In step S1708, the CPU 401 reads until the end of the destination folder path part 1222, and stores the read folder path. Upon storing, the processing proceeds to step S1710.

In step S1710, the CPU 401 determines whether or not a termination text string of the read part is the MIME termination text string 1226 indicated in FIG. 10C. If the termination text string is the MIME termination text string 1226, the processing proceeds to step S1711, and otherwise the processing returns to step S1702. In step S1705, the CPU 401 determines whether the file part 1225 was read. In a case where the file part 1225 is read, the processing proceeds to step S1712; otherwise, the processing proceeds to step S1713. As described above, in step S1713, the CPU 401 transmits information indicating an error as a response to the print request, and the processing ends.

In step S1712, the CPU 401 additionally registers in association, in the print request registered in the print list in step S1701, the file name and the saving name stored in step S1701, the destination folder path stored in step S1708, and the temporary setting saved in step S1709. Next, in step S1714, the CPU 401 transmits information indicating success as a response to the print request, and the processing ends.

<Sequence of Processing for Case of Processing Print Request of Print List>

Next, referring to FIG. 16, a sequence of processing for sequentially printing print requests of a print list stored in the RAM 402 will be described. The processing described below may be realized by, for example, the CPU 401 of the multifunctional peripheral 101 reading out a control program stored in the ROM 403 or the HDD 404 to the RAM 402 and executing the control program. The CPU 401 performs the processing of the print request shown in FIG. 16 in parallel with the processing for the time of receiving the print request shown in FIG. 15. When it is detected that the print list stored in the RAM 402 is changed, the processing is started.

In step S1801, the CPU 401 determines whether or not the path of a file is stored in the first print request of the print list. If not even one print request is stored in the print list or the path of a file is not stored in the first print request, the processing is terminated.

In step S1802, the CPU 401 retrieves the print request for which print processing has been performed, that is, the first print request, from the print list, and deletes this print request from the print list. After deletion, the processing proceeds to step S1803. Subsequently, in step S1803, the CPU 401 performs print processing of the print request retrieved in step S1802. This processing will be described later with reference to FIG. 17. When the print processing of the print request has been performed, the processing proceeds to step S1801.

<Sequence of Processing for Printing of Print Request>

Figure 17:
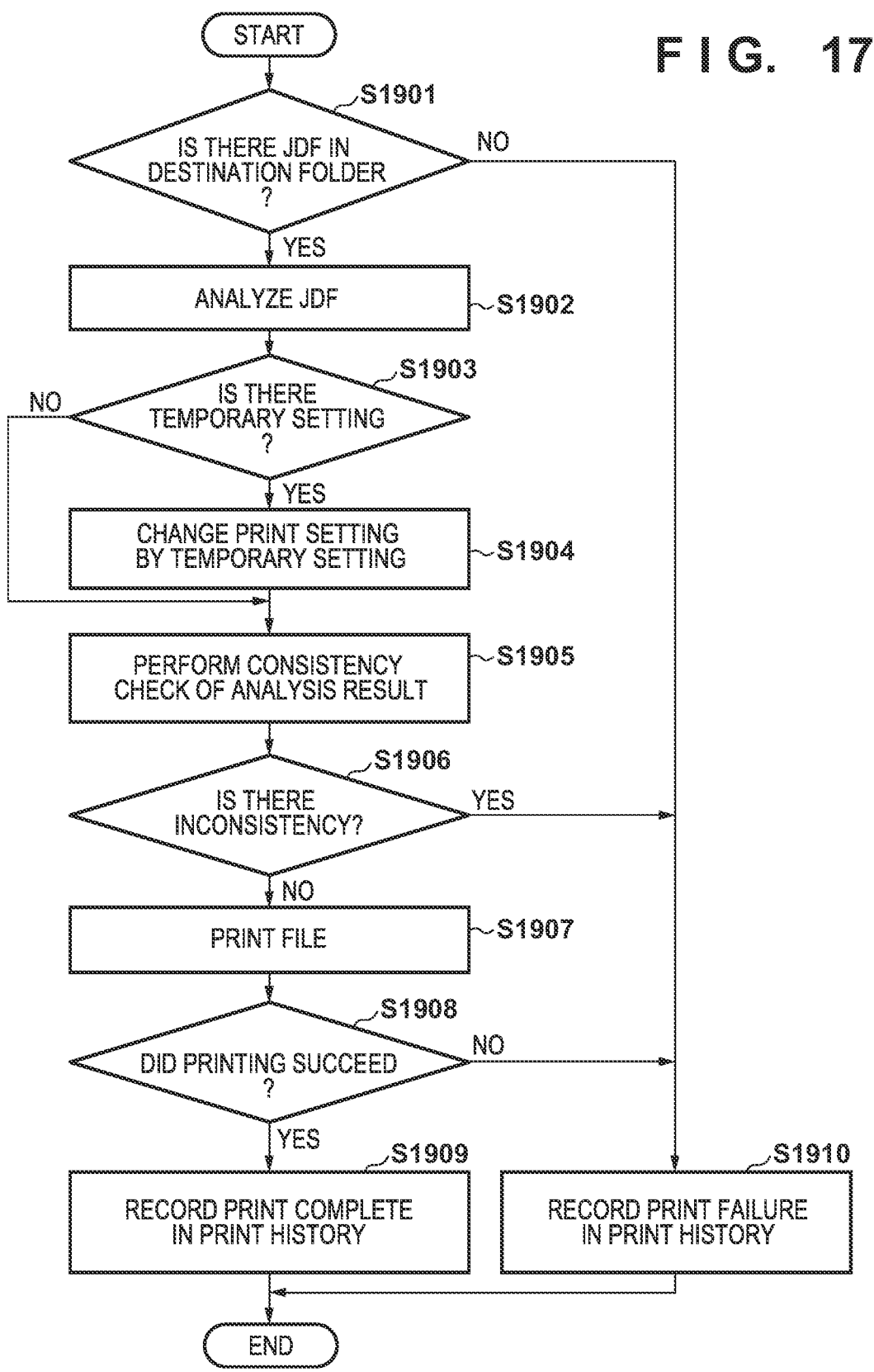
FIG. 17 is a flow chart for describing a sequence of the CPU in print processing.

Next, referring to FIG. 17, a sequence of processing by the CPU 401 in the processing of the print request of step S1803 will be described. The processing described below may be realized by, for example, the CPU 401 of the multifunctional peripheral 101 reading out a control program stored in the ROM 403 or the HDD 404 to the RAM 402 and executing the control program. This processing starts when the CPU 401 determines in the above step S1801 that the path of the file in the first print request of the print list is stored.

In step S1901, the CPU 401 determines whether or not there is a print setting file in the destination folder which is stored in the first print request of the print list. Here, it is assumed that the print setting file is a JDF file, and it is determined whether or not a file is a JDF file in accordance with the file extension. If there is a JDF file, the processing proceeds to step S1902; if there is no JDF file, the processing proceeds to step S1910. When the folder itself is not present, it is determined that there is no JDF file.

In step S1902, the CPU 401 analyzes the JDF file. In this processing, syntax analysis and semantic analysis of the JDF file are performed, and values necessary for print settings are acquired. The print settings acquired here are the print settings designated by the creation screens described by FIG. 8A to FIG. 8F. Next, in step S1903, the CPU 401 determines whether or not a temporary setting is registered in the print request. If registered, the processing proceeds to step S1904, and if not registered the processing proceeds to step S1905. In step S1904, the CPU 401 changes the result of analyzing the JDF acquired in step S1902 by the content of the temporary setting registered in the print request, and the processing proceeds to step S1905. What is changed is only the value of an item designated by the temporary setting. What is changed is the result of analyzing the JDF, and not the JDF file itself.

In step S1905, the CPU 401 performs a consistency check on the result of analyzing the JDF, and the processing proceeds to step S1906. An inconsistency is determined in a case where there is an inconsistency in the JDF file itself, such as a case where a print setting designated by the JDF file cannot be performed by the present device configuration, a case where a conflict with another setting has occurred due to the change by the temporary setting, or the like. In step S1906, the CPU 401 determines the result of step S1905, and upon determining that there is an inconsistency the processing proceeds to step S1910, and if it is determined that there is no inconsistency, the processing proceeds to step S1907.

In step S1907, the CPU 401 acquires the file path stored in the first print request of the print list, and prints the file, and the processing proceeds to step S1908. For printing of the file, if there is a temporary setting, the result of analyzing the JDF which was changed based on the temporary setting in step S1904 is used as the print settings, and if there is no temporary setting, the result of analyzing the JDF of step S1902 is used as the print settings. Next, in step S1908, the CPU 401 determines whether or not printing of the file which was performed in step S1907 succeeded. Printing fails in a case where a print file does not exist, a case where printing is canceled part way through, or the like. If it is determined that printing succeeded, the processing proceeds to step S1909; otherwise, the processing proceeds to step S1910.

In step S1909, the CPU 401 stores the print request as printing complete at the end of the print history stored in the RAM 402, and ends the processing. In contrast, in step S1910, the CPU 401 stores the print request as printing failed at the end of the print history stored in the RAM 402, and ends the processing.

<Sequence of Processing for when Print Setting Confirmation Screen Request is Accepted>

Figure 18:
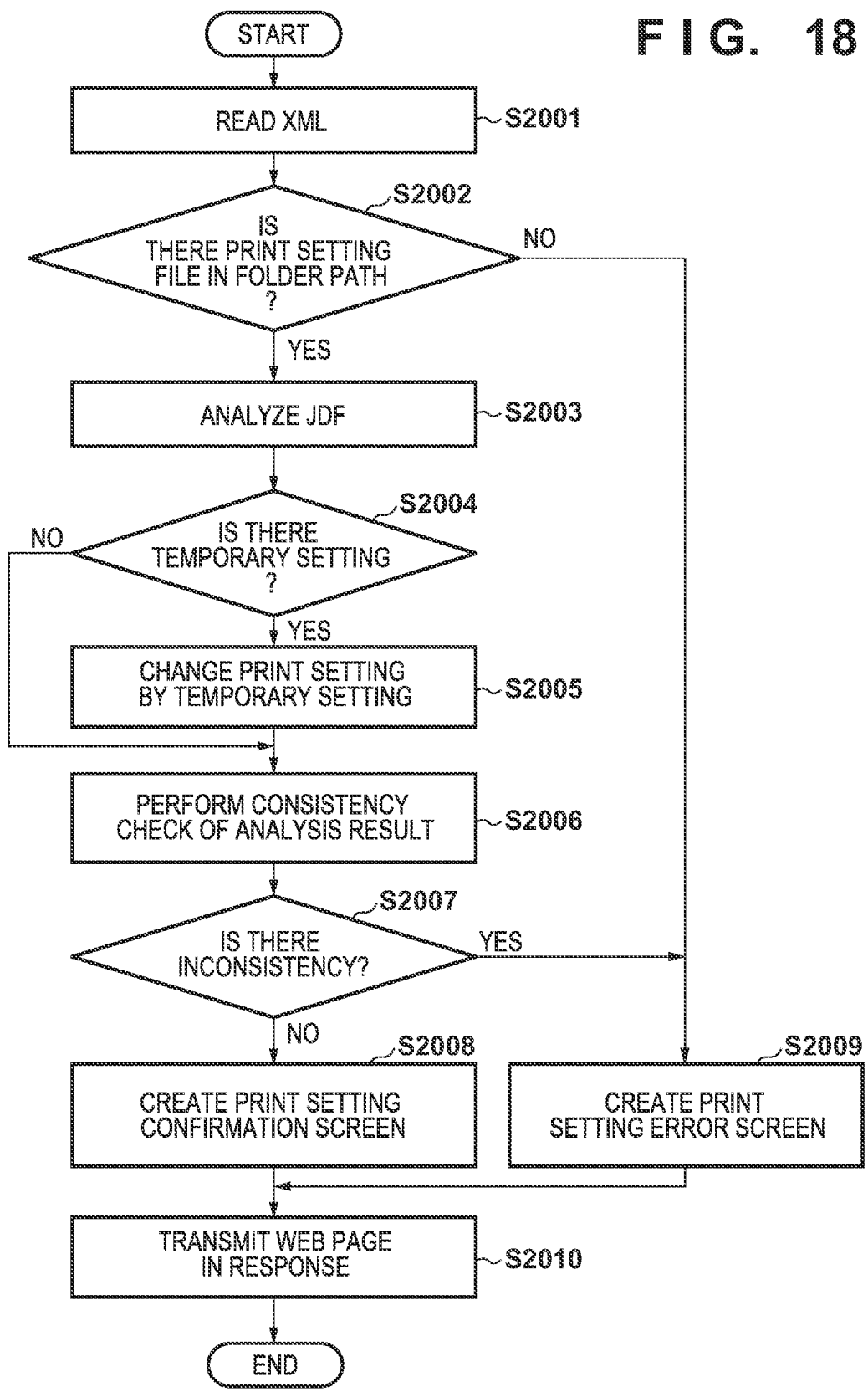
FIG. 18 is a flow chart for describing a sequence of the CPU when a request for a print setting confirmation screen is accepted.

Next, referring to FIG. 18, description is made for a sequence of processing by the CPU 401 of the multifunctional peripheral 101 when a request for a print setting confirmation screen is accepted. The processing described below may be realized by, for example, the CPU 401 of the multifunctional peripheral 101 reading out a control program stored in the ROM 403 or the HDD 404 to the RAM 402 and executing the control program. This processing is started when a print setting confirmation screen request is accepted from the Web browser 705 of the client apparatus.

In step S2001, the CPU 401 reads the print setting confirmation screen request XML 1230 indicated in FIG. 10D from a received job setting confirmation request, and the processing proceeds to step S2002. In step S2002, the CPU 401 determines whether or not there is a print setting file in the folder of the folder path designated by the folder path element 1231. This processing is the same as that of step S1901. If there is a JDF file, the processing proceeds to step S2003; if there is no JDF file, the processing proceeds to step S2009.

In step S2003, the CPU 401 analyzes the JDF file. This processing is the same as that of step S1902. When the analysis ends, the processing proceeds to step S2004. In step S2004, the CPU 401 determines whether or not a temporary setting is included in the print setting confirmation screen request XML 1230 read in step S2001. If one is included, the processing proceeds to step S2005, and if not included the processing proceeds to step S2006. In step S2005, the CPU 401 changes the JDF analysis result acquired in step S2003 by the temporary setting acquired in step S2001, and the processing proceeds to step S2006. This processing is the same as that of step S1904.

In step S2006, the CPU 401 performs a consistency check on the result of analyzing the JDF, and the processing proceeds to step S2007. This processing is the same as that of step S1905. In step S2007, the CPU 401 determines a result of step S2006. This processing is the same as that of step S1906. If it is determined that there is an inconsistency, the processing proceeds to step S2009, and if it is determined that there is no inconsistency, the processing proceeds to step S2008.

In step S2008, the CPU 401 creates a Web page for the confirmation screen 1300 or the confirmation screen 1310, and the processing proceeds to step S2010. The confirmation screen 1300 is created if there is a temporary setting in the print setting confirmation screen request XML 1230 read in step S2001, and the confirmation screen 1310 is created if there is no temporary setting. As described by FIG. 11B, the confirmation screen 1310 is something in which a designation of the print setting file is changed by the temporary setting, and the CPU 401 creates the Web page by changing the color or font for a changed item. Once created, the processing proceeds to step S2010. In contrast, in step S2009, the CPU 401 creates the Web page of the print setting error screen 1320 and the processing proceeds to step S2010. As described by FIG. 11C, the print setting error screen 1320 includes a message indicating detail of the error that occurred in step S2007.

In step S2010, the CPU 401 transmits the Web page created in step S2008 or step S2009 to the Web browser 705 of the client apparatus as a response, and the processing ends.

<Change of Print List>

Next, referring to FIG. 19A to FIG. 19E, description is given for the reception of print requests that was described using FIG. 15 and FIG. 16, and how the print list stored in the RAM 402 changes in processing of the print requests.

FIG. 19A shows a case where a print request for "document.pdf" received in folder02 (1124) is added to the end of the print list in step S1701. In association with the ID "102" assigned to identify the request, a destination folder path, the name of who inputted the request, a file name, and a number of copies designation "5" and print medium "A3" designated as temporary settings, are acquired from the print request and registered. However, the file path is not registered because saving of the file is not complete. File reception has completed for a previously accepted "marketing_materials.pdf", and its file path is additionally registered in step S1705.

FIG. 19B shows the print list for when processing of the print request for "marketing_materials.pdf" is started. The print request whose ID is 101 is deleted in step S1802. Even at this time point, since the reception of the file "document.pdf" has not completed, the file path is not registered in the print request whose corresponding ID is 102. Processing for a print list print request in FIG. 16 ends from step S1801.

FIG. 19C is where a print request for "handout.pdf" received in folder01 (1123) is added to the end of the print list in step S1701. Because a temporary setting is not designated, a temporary setting is not registered. At this point in time, because reception of the file for "document.pdf" has not ended and the file path is not registered, the processing of FIG. 16 for a print request of the print list ends after step S1801.

FIG. 19D is for a print list when saving of "handout.pdf" completes, and the file path is additionally registered in the print request whose ID is 103 in step S1705. At this point in time, because reception of the file for "document.pdf" has not ended and the file path is not registered, the processing of FIG. 16 for a print request of the print list ends after step S1801.

FIG. 19E is the print list when the saving of "document.pdf" is completed and the file path is additionally registered in the print request whose ID is 102 in step S1705. In step S1802, the first print request of the print list is retrieved, and processing of the print request starts in step S1803.

As described above, the multifunctional peripheral (image forming apparatus) according to the present embodiment has a storage unit that provides a folder with which print setting information is associated, and an image forming unit for forming an image on a sheet. The present image forming apparatus transmits, to an external apparatus, screen information for causing a screen for accepting a designation of a print file to be transferred to the image forming apparatus in association with the folder to be displayed. The screen enables acceptance of a temporary setting that is applied in preference to print setting information stored in the folder in advance. In addition, the present image forming apparatus causes the image forming unit to execute image formation based on the print file transferred in association with the folder, in accordance with print settings resulting from preferentially applying a setting item of the temporary setting to the print setting information.

In this manner, in this embodiment, it is possible to suitably change a setting temporarily, even with an in-device hot folder where a print setting file is saved in a folder of the multifunctional peripheral 101 and a print file is inputted to the folder to thereby perform printing using print settings of the print setting file. Specifically, it is possible to designate a print setting that often changes in accordance with a file, such as a number of copies or a sheet size, as a setting to use temporarily without changing the print setting file. In addition, a consistency check for print settings after a setting to use temporarily is applied is executed, and a result is transmitted as a print setting confirmation screen that can be displayed on a Web page. As a result, even if a conflict between a setting performed by a temporary setting and an original setting occurs, a user can know this before a print request is made, and it is possible to make a correction in advance.

Second Embodiment

Description is given below regarding a second embodiment of the present invention. In the first embodiment described above, it is necessary to designate a temporary setting before performing a print instruction. However, a setting such as a number of copies is something that changes each time of printing, and designation in advance is cumbersome. It is assumed that what is designated would be forgotten. In the present embodiment, description is given regarding a configuration and control for, by making a temporary setting operation before a print instruction unnecessary and enabling a temporary setting to be designated at a time of a print request operation, eliminating effort and preventing a designation from being forgotten. Explanation regarding configuration and control similar to that of the first embodiment described above is omitted. Note that, the present embodiment can be applied in combination with the first embodiment described above. In other words, in this embodiment, it is possible to perform a temporary setting at two timings: before a print instruction is performed, and at a time of a print request operation. Therefore, in a case where a temporary setting has been performed before a print instruction is made, a setting screen in which setting values for this case have been reflected is displayed in a changeable state when a temporary setting for a time of a print request operation is performed.

<Processing Sequence when Accepting Operation on Web Browser>

Figure 20A:
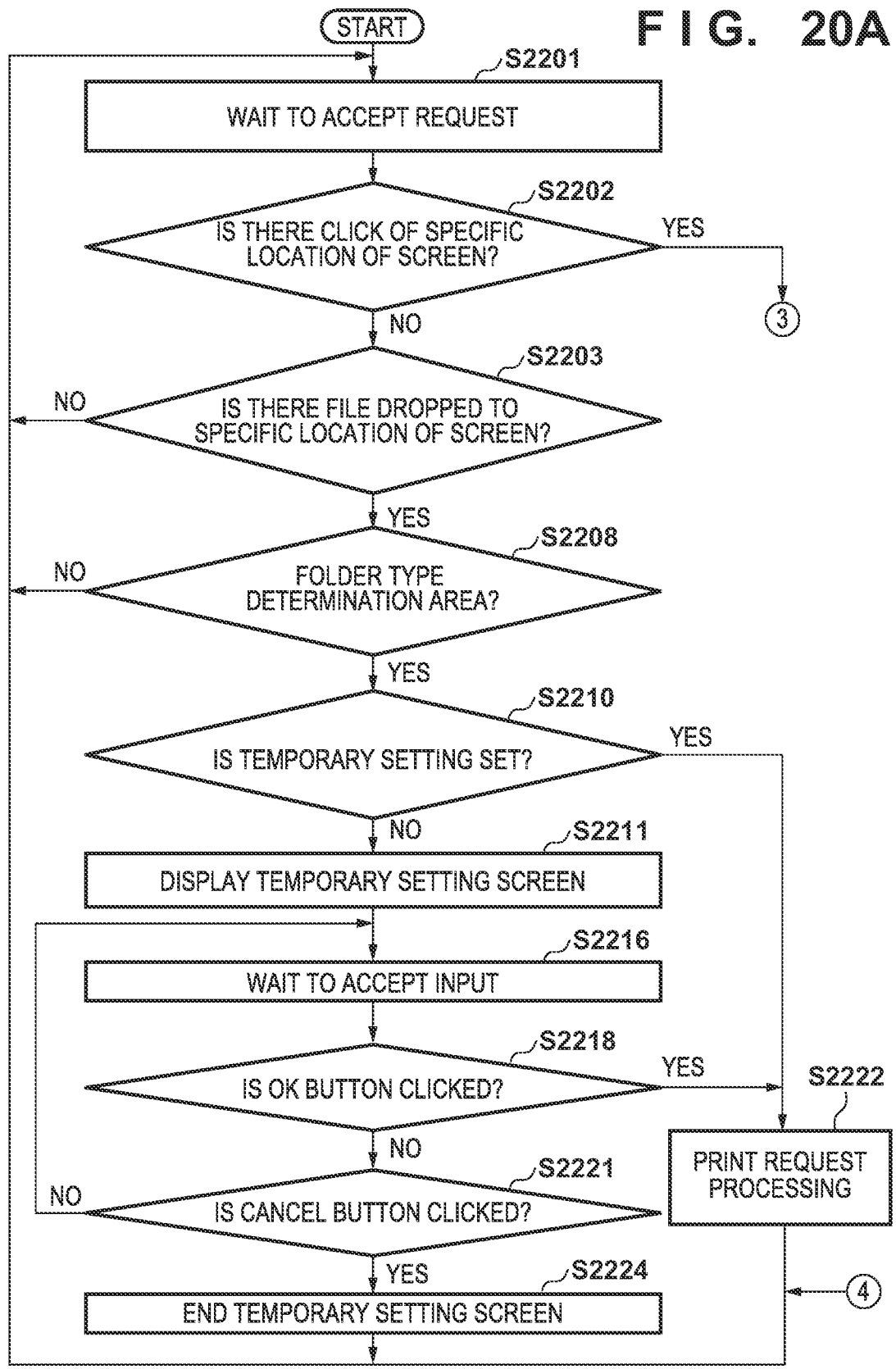
FIG. 20A to FIG. 20C are flow charts showing a sequence of processing by a CPU 501 when an operation is accepted by the web browser.
Figure 20B:
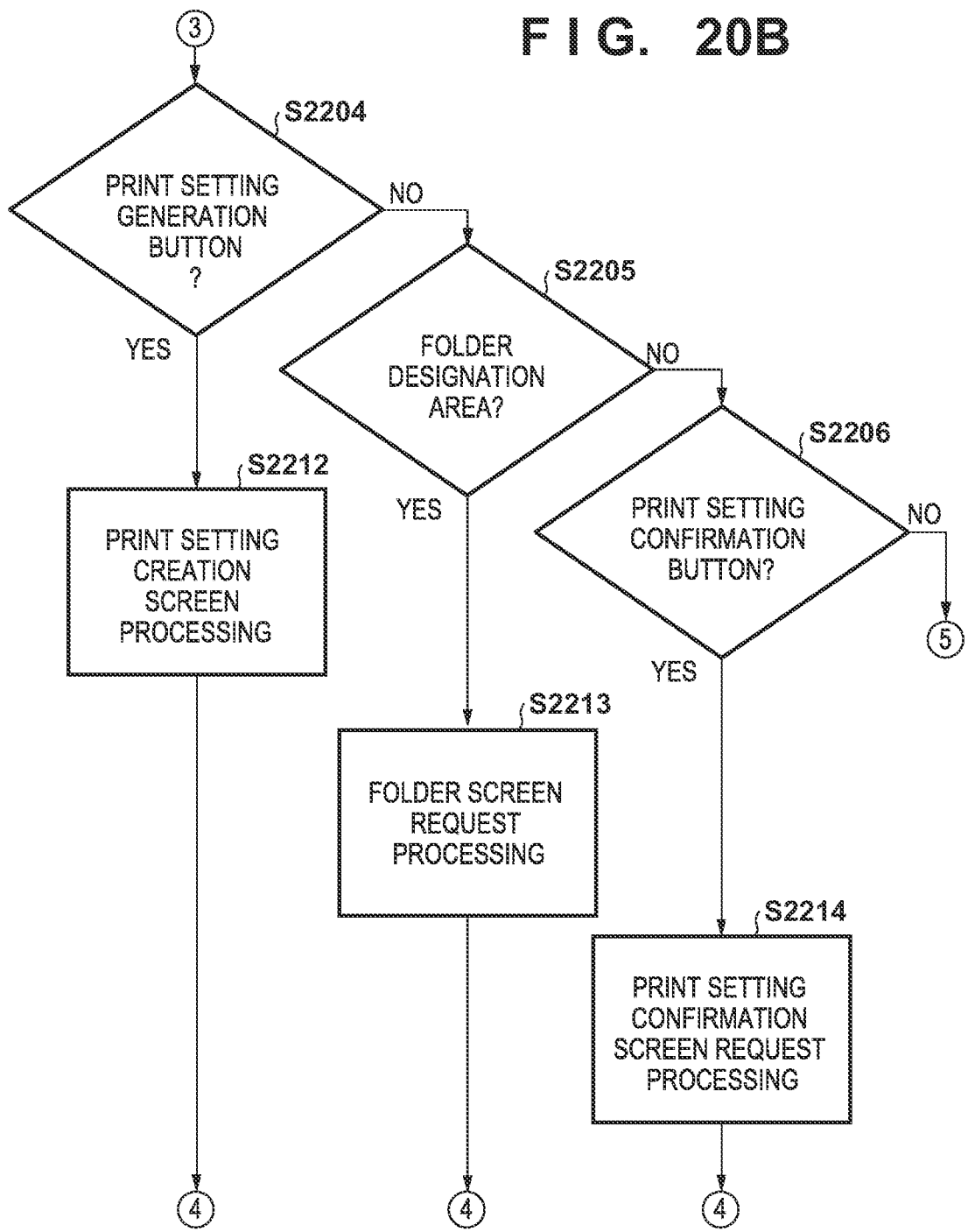
Figure 20C:
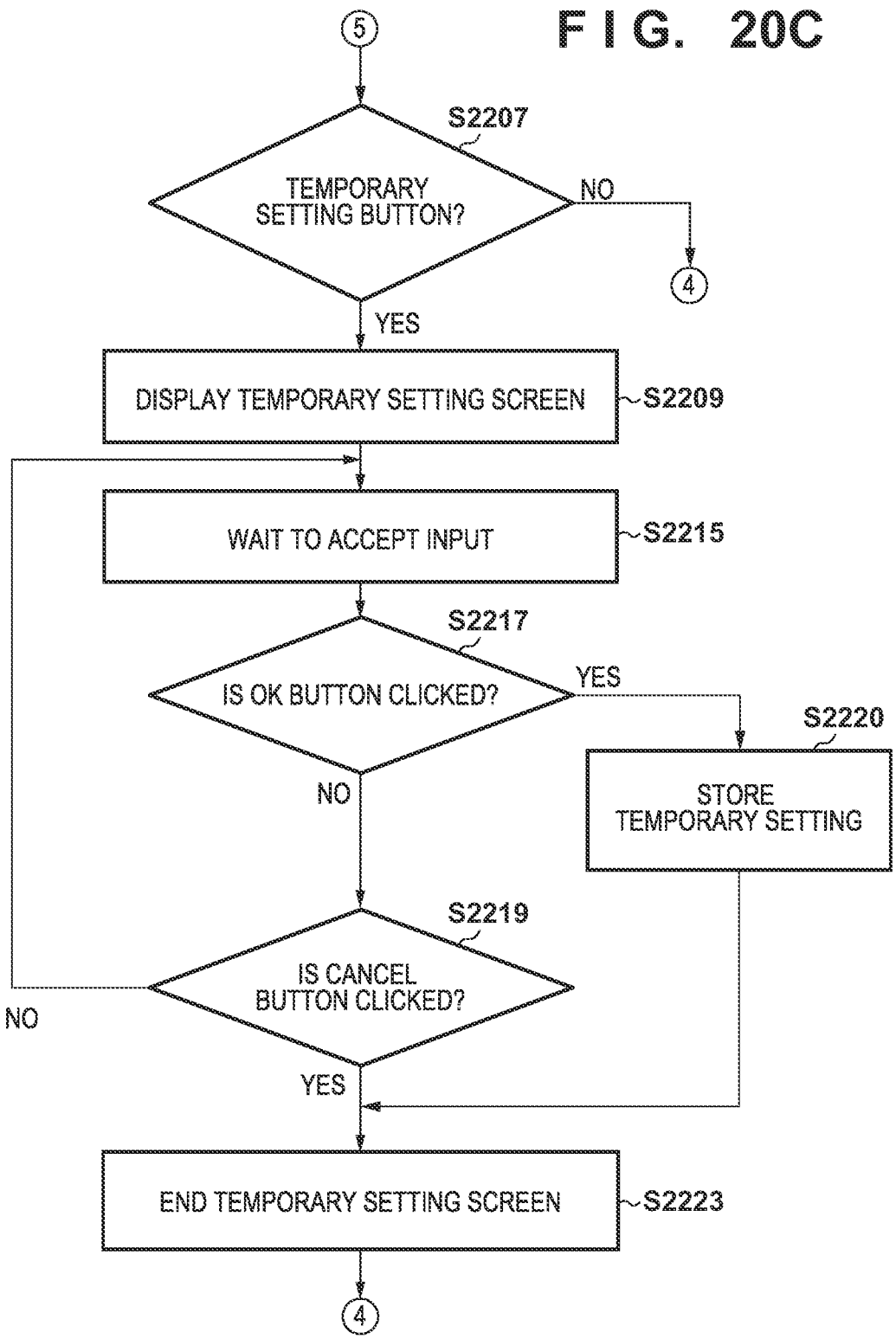

Referring to FIGS. 20A to 20C, a sequence of processing by the CPU 501 when executing the functions described in FIG. 7A to FIG. 12E will be described. The processing described below may be realized by, for example, the CPU 501 of the client apparatus reading out a control program stored in the ROM 503 or the HDD 511 to the RAM 502 and executing the control program. This flow chart corresponds to the flow chart of FIGS. 13A and 13B of the first embodiment described above. Description is omitted for processing similar to that of FIGS. 13A and 13B. That is, step S2201 to step S2209 is similar to step S1501 to step S1509. In addition, step S2212 to step S2215 is similar to step S1511 to step S1514. Step S2217 is similar to step S1515. Step S2219 and step S2220 are similar to step S1516 and step S1517. Step S2222 is similar to step S1510. Step S2222 is similar to step S1510.

In step S2210, the CPU 501 determines whether or not a temporary setting is set. A state in which a temporary setting is set is where a temporary setting valid folder display screen 1220 is displayed, and the temporary setting is stored in the RAM 502. If a temporary setting is set, the processing proceeds to step S2222; otherwise, the processing proceeds to step S2211.

In step S2211, the CPU 501 displays the temporary setting screen 1200 on the Web browser 705 and accepts input. Next, in step S2216, the CPU 501 waits for input from a user. The processing remains at step S2216 until input is accepted. Upon accepting input, the processing proceeds to step S2218. In step S2218, the CPU 501 determines whether or not the operation accepted in step S2216 is an operation of clicking the OK button 1205. In a case of an operation that clicks the OK button 1205, the processing proceeds to step S2222; otherwise, the processing proceeds to step S2221.

In step S2221 the CPU 501 determines whether or not the operation accepted in step S2216 is an operation of clicking the cancel button 1204. In the case of an operation that clicks the cancel button 1204, the processing proceeds to step S2224; otherwise, the processing proceeds to step S2216. In step S2224, the CPU 501 ends the temporary setting screen 1200, and displays the folder display screen for before the temporary setting screen 1200 was displayed. In this case, a print request is not executed.

As described above, a multifunctional peripheral (an image forming apparatus) according to the present embodiment performs control to display a screen for performing a temporary setting in a case where a temporary setting is not designated when a print request operation is accepted. With this, there ceases to be a need to perform a temporary setting before a print request, and it is possible to reduce effort for a user. In addition, because a print request is not executed until confirmation is made by selecting the OK button 1205, it is also possible to prevent a setting from being forgotten. Note that, in the present embodiment, a case where a temporary setting has not been designated in advance was given for a condition for displaying a temporary setting at a time of a print request operation. However, the present invention is not limited to this, and configuration may be taken to provide, as a condition for displaying a temporary setting at a time of a print request operation, a function for setting whether to display a temporary setting screen for each folder or as an overall setting, and, in accordance with this setting, switch between displaying or hiding a temporary setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-141634 filed on Jul. 27, 2018, which is hereby incorporated by reference herein in its entirety.

What is claimed is:

1. An image forming apparatus comprising:
  a memory device that stores a set of instructions and a folder with which print setting information is associated;
  an image forming unit that forms an image on a sheet; and
  at least one processor that executes the set of instructions to:
  transmit, to an external apparatus, screen information for causing to display a screen for accepting a designation of a print file to be transferred to the folder, the screen being able to accept a temporary setting to be applied in preference to the print setting information in association with the folder; and
  cause the image forming unit to execute image formation based on the print file transferred in association with the folder, in accordance with a print setting resulting from preferentially applying a setting item of the temporary setting to the print setting information.

2. The image forming apparatus according to claim 1, wherein
  the at least one processor executes instructions in the memory device to:
  determine a consistency of a print setting to which the setting item of the temporary setting has been preferentially applied; and
  in a case where it is determined that there is an inconsistency in the print setting, notify a failure of printing to the external apparatus without causing the image forming unit to execute image formation of the print file, and in a case where it is determined that there is no inconsistency in the print setting, cause the image forming unit to execute image formation of the print file.

3. The image forming apparatus according to claim 2, wherein
the at least one processor executes instructions in the memory device to:
determine that there is an inconsistency in the print setting in a case where the print setting cannot be performed by the image forming apparatus, or in a case where the temporary setting conflicts with another setting item out of the print setting information.

4. The image forming apparatus according to claim 1, wherein
the at least one processor executes instructions in the memory device to:
determine a consistency of the print setting to which the setting item of the temporary setting has been preferentially applied;
accept from the external apparatus a request for a confirmation screen for confirming the print setting of the print file via the screen;
in a case where it is determined that there is an inconsistency in the print setting, transmit, to the external apparatus, screen information for causing the external apparatus to display an error screen that enables a factor of the inconsistency of the print setting to be confirmed; and
in a case where it is determined that there is no inconsistency in the print setting, transmit, to the external apparatus, screen information for causing to display the confirmation screen of the print setting.

5. The image forming apparatus according to claim 1, wherein
in a case where temporary settings for one or more setting items are accepted via the screen, a temporary setting of each setting item that has been set is superimposingly displayed on the screen to enable confirmation.

6. The image forming apparatus according to claim 1, wherein
the at least one processor executes instructions in the memory device to:
in a case where a print request for a print file is accepted from the external apparatus via the screen, transmit, to the external apparatus, screen information for causing to display a setting screen that can accept the temporary setting.

7. The image forming apparatus according to claim 1, wherein
the at least one processor executes instructions in the memory device to:
in a case where a print request for a print file is accepted from the external apparatus via the screen, if a temporary setting is not included in the print request, transmit, to the external apparatus, screen information for causing to display a setting screen that can accept the temporary setting.

8. The image forming apparatus according to claim 1, wherein
the at least one processor executes instructions in the memory device to:
in a case where a request for performing a print setting with respect to a predetermined folder is accepted from the external apparatus via the screen, transmit, to the external apparatus, screen information of a setting screen for performing a print setting of the predetermined folder,
wherein print setting information accepted via the setting screen is stored in the predetermined folder.

9. The image forming apparatus according to claim 1, wherein
the temporary setting includes at least one of a designation of a number of copies, a designation of a sheet size, and a designation of a page range.

10. A method of controlling an image forming apparatus having a memory operable to provide a folder with which print setting information is associated, and an image forming unit operable to form an image on a sheet, the method comprising:
transmitting, to an external apparatus, screen information for causing to display a screen for accepting a designation of a print file to be transferred to the folder, the screen being able to accept a temporary setting to be applied in preference to the print setting information in association with the folder; and
causing the image forming unit to execute image formation based on the print file transferred in association with the folder, in accordance with a print setting resulting from preferentially applying a setting item of the temporary setting to the print setting information.

11. A non-transitory computer-readable storage medium storing a computer program for causing a computer to execute each step of a method of controlling an image forming apparatus having a memory operable to provide a folder with which print setting information is associated, and an image forming unit operable to form an image on a sheet, the method comprising:
transmitting, to an external apparatus, screen information for causing to display a screen for accepting a designation of a print file to be transferred to the folder, the screen being able to accept a temporary setting to be applied in preference to the print setting information in association with the folder; and
causing the image forming unit to execute image formation based on the print file transferred in association with the folder, in accordance with a print setting resulting from preferentially applying a setting item of the temporary setting to the print setting information.

12. A system in which an image forming apparatus and an information processing apparatus can communicate, wherein
the information processing apparatus comprises:
a first memory device that stores a set of instructions; and
at least one first processor that executes the set of instructions to:
receive, from the image forming apparatus, screen information for causing the information processing apparatus to display a screen for accepting a designation of a print file to be transferred to a folder, the screen being able to accept a temporary setting to be applied in preference to print setting information in association with the folder; and
notify the image forming apparatus of user input inputted via the screen, and
the image forming apparatus comprises:
a second memory device that stores a set of instructions and a folder with which print setting information is associated;
an image forming unit configured to form an image on a sheet; and
at least one second processor that executes the set of instructions to:
transmit the screen information to the information processing apparatus; and
cause the image forming unit to execute image formation based on the print file transferred in association with the folder, in accordance with a print setting resulting from preferentially applying a setting item of the temporary setting to the print setting information.

13. A method of controlling a system in which an information processing apparatus can communicate with an image forming apparatus having a memory operable to provide a folder with which print setting information is associated, and an image forming unit operable to form an image on a sheet, the method comprising:

the information processing apparatus receiving, from the image forming apparatus, screen information for causing the information processing apparatus to display a screen for accepting a designation of a print file to be transferred to the folder, the screen being able to accept a temporary setting to be applied in preference to the print setting information in association with the folder; and notifying the image forming apparatus of user input inputted via the screen, and the image forming apparatus transmitting the screen information to the information processing apparatus; and causing the image forming unit to execute image formation based on the print file transferred in association with the folder, in accordance with a print setting resulting from preferentially applying a setting item of the temporary setting to the print setting information.

\* \* \* \* \*